United States Patent
Maruyama et al.

[11] Patent Number: 5,136,662
[45] Date of Patent: Aug. 4, 1992

[54] IMAGE PROCESSOR FOR SEQUENTIAL PROCESSING OF SUCCESSIVE REGIONS OF AN IMAGE

[75] Inventors: Masakatsu Maruyama; Shiro Sakiyama; Hiroyuki Nakahira; Yoshitaka Kitao, all of Osaka; Toshiyuki Araki, Kyoto, all of Japan

[73] Assignee: Matsushita Electric Industrial. Co., Ltd., Osaka, Japan

[21] Appl. No.: 449,194

[22] Filed: Dec. 13, 1989

[30] Foreign Application Priority Data

Dec. 13, 1988 [JP] Japan ................... 63-314026
Apr. 26, 1989 [JP] Japan ................... 1-108637

[51] Int. Cl.$^5$ .............................. G06K 9/54
[52] U.S. Cl. ........................ 382/49; 382/41; 382/42; 382/27
[58] Field of Search .............. 382/49, 41, 42, 27, 382/9, 37; 364/200 MS File, 900 MS File, 736, 715, 146; 358/166, 167, 452, 464, 447, 448

[56] References Cited

U.S. PATENT DOCUMENTS

| 4,079,447 | 3/1978 | Garziera .................. 364/200 |
| 4,710,965 | 7/1985 | Kobayashi ................. 382/49 |
| 4,779,192 | 10/1988 | Torin et al. .............. 364/200 |
| 4,791,677 | 12/1988 | Mori et al. . | |
| 4,845,767 | 7/1989 | Mori et al. . | |
| 4,850,027 | 2/1988 | Kimmel ................... 382/49 |
| 4,888,646 | 12/1989 | Umeda et al. ............ 382/9 |

*Primary Examiner*—Michael Razavi
*Attorney, Agent, or Firm*—Lowe, Price, LeBlanc & Becker

[57] ABSTRACT

A local image processor is configured as a plurality of image processor elements each having a local image memory, and a single shift register circuit for supplying to the local image memories successive local images formed of an array of pixels of a source image. Each processor element includes a register holding a count value indicating the position within the source image of data that are currently being processed by that element, and the processor elements also include mutually interconnected registers whereby intermediate computation results obtained by one processor element can be utilized by another element during parallel processing operation.

10 Claims, 17 Drawing Sheets

IMAGE PROCESSOR FOR SEQUENTIAL PROCESSING OF SUCCESSIVE REGIONS OF AN IMAGE

BACKGROUND OF THE INVENTION

1. Field of Applicable Technology

The present invention relates to an image processor for processing data representing a source image, and in particular to a local image processor which executes processing of local image data representing successive sets of pixels extracted from the source image, and which is suitable for multiprocessor parallel operation.

2. Prior Art Technology

In the prior art, in order to achieve a high speed of processing of an image formed of an array of pixels, various methods of parallel processing have been proposed, i.e. in which data of a plurality of pixels are processed in parallel. The image processing can include such operations as spatial mathematical processing, non-linear approximation computations, etc. At present, the generally utilized method for parallel image processing is to employ a plurality of "local image" processors, each of which sequentially processes successive small "local images" from a source image, with these processors operating in parallel. Each local image consists of an array of pixels extracted from a pixel array which forms the source image. The larger the size of each local image, the more complex becomes the operation, and the advantage of increased speed of processing is difficult to achieve. In addition, since each local image processor must temporarily store local image data, large amounts of memory capacity are required if the local image size is made large.

For that reason, the local image size is set as a small array of m by n pixels (were m and n are fixed integers, for example each having the value 3). As successive local images are sequentially processed, the local image region is in effect repetitively moved across the source image by successive horizontal scans which are sequentially displaced vertically by one line of pixels.

Prior art examples of such local image processors which are relevant to the present invention are described for example by Mori et al in U.S. Pat. No. 4,845,767 and U.S. Pat. No. 4,791,677.

In the prior art, such local image processing has generally been used for example for operations in which each local image is processed and the results obtained are used to determine a condition (e.g. brightness level) of one corresponding pixel of an output image that is subsequently generated. In addition to the types of image processing operations mentioned above, such local image processing is also suitable for a wide range of processing including averaging operations, differentiation operations, data conversion, etc. Since the circuit scale can be made comparatively small, circuits for executing such local image processing have been increasingly implemented as LSI integrated circuit devices. However in the prior art, although such local image processors are available which can be connected for parallel multiprocessor operation in order to achieve a higher processing speed, this is only possible for a type of processing in which each of the local image processors executes an identical type of operation. To achieve multiprocessor operation when it is necessary for each local image processor to execute a different operation (as required in image feature abstraction, described hereinafter) it has been necessary to use specially designed dedicated processors, so that that prior art local image processors are lacking in flexibility of use.

FIG. 1 shows a prior art example of a local image processor, in which the local image region size is 3×3 pixels. The local image processor 10 includes a local image register 1, for holding the local image, which receives image signal data representing successive pixels. Specifically, the local image register 1 receives the image signal (i.e. generated by converting each of successive pixels of the source image into a corresponding set of n data bits, which are supplied as a parallel n-bit data signal constituting the image signal), the image signal delayed by one horizontal scanning line of the source image, and the image signal delayed by two horizontal scanning lines, i.e. the local image register 1 receives three sets of input signal lines. A program memory 3 serves to store a program for executing the local image processing, and is controlled by a program control circuit 4. To control the execution of local image processing, the program memory 3 also produces output signals for controlling operations of the local image register 1, a computation section 2 and the program control circuit 4. A clock signal control circuit 5 operates on the basis of input signals applied thereto, i.e. a system control signal, a program "start" signal, and a chip expansion signal, and controls the inputting of image signal data to the local image register 1, the outputting of computation results from the computation section 2, and also the operation of the program control circuit 4.

The local image processor 10 executes identical processing (determined by the contents of the program memory 3) on each set of local image data, and thereby obtains processing results based on all the pixels of the entire source image, which are outputted from the computation section 2.

FIG. 2 shows examples of operating waveforms of various sections of the local image processor 10 of FIG. 1. The local image register 1 consists of a set of three shift registers (which respectively receive as input signals the image signal, the image signal delayed by one horizontal scanning line of the source image, and the image signal delayed by two horizontal scanning lines) each shift register having a set of three shift register stages 6, with the output of each shift register stage 6 being supplied to a corresponding memory cell 7. The output data of each shift register stage 6 can be written into the corresponding memory cell 7 under the control of a memory write signal that is produced by the clock signal control circuit 5. A "shift" signal operation is executed by each of these shift registers in response to each pulse of a "shift" signal that is produced from the clock signal control circuit 5, with this "shift" signal being generated in synchronism with rising edges of the system clock signal that is also generated from the clock signal control circuit 5. That is, data for a new set of 3 pixels are shifted in parallel into the local image register 1, to configure a new local image, at each rising edge of the "shift" signal, and these local image data are written into the respective ones of the memory cells 7 on the next falling edge of the memory write signal, which is synchronized with the system clock signal.

The system clock signal is inputted to the clock signal control circuit 5 from an external source, to control the timings of overall operations of the local image processor. The clock signal control circuit 5 also generates a "program start" signal, which is synchronized with the "shift" signal and which functions to initiate processing operations by the local image processor. The clock signal control circuit 5 also receives a chip expansion signal, which is utilized when a plurality of such local image processors are to be operated together. The "shift" signal from the clock signal control circuit 5 is generated based on the "start" signal and the system clock signal, and goes to the high logic level (referred to in the following as the "H" level) on the rising edge of the first system clock signal pulse to occur after the "program start" signal goes to the "H" level, and returns to the low logic level (hereinafter referred to as the "L" level) on the next falling edge of the system clock signal. The "shift" signal is controlled in accordance with the state of the chip expansion signal, such as to be inhibited when the chip expansion signal is at the "H" level, as shown in FIG. 2. An "output enable" signal is produced based on the "start" signal and the chip expansion signal.

As described above, data are normally shifted into the local image register 1 at each rising edge of the "shift" signal from the clock signal control circuit 5. At this time, if the chip expansion signal is at the "L" level, the memory write signal also goes to the "H" level, and the new image data are stored into the memory cells 7, while at the same time the "start" signal produced from the clock signal control circuit 5 goes to the "H" level. The "start" signal is supplied to the program control circuit 4, which is thereby reset to produce an initial address value for the program memory 3, and the address values generated by the program control circuit 4 are thereafter successively determined by the condition signal from the computation section 2, in successive periods of the system clock signal. In response to each address value supplied thereto from the program control circuit 4, the program memory 3 outputs command signals etc. in accordance with the program contents corresponding to that address, which are supplied to the local image register 1, the computation section 2 and the program control circuit 4 as shown in FIG. 1. The contents of specific ones of the memory cells 7 are thereby transferred to the computation section 2, and processing executed thereon by the computation section 2, in accordance with the program contents of the program memory 3. The sequence of address values that are outputted from the program control circuit 4 can be modified in accordance with the program contents, or can be modified in accordance with results obtained during processing (by the condition signal supplied from the computation section 2 to the program control circuit 4). In this way the program can execute jump operations.

When the "output enable" signal from the clock signal control circuit 5 goes to the "H" level, the operational results that have been obtained are outputted from the computation section 2. If the chip expansion signal goes to the "H" level, then the "output enable" signal is held at the "L" level, and the data outputs of the computation section 2 are held at the "L" level.

It is possible to utilize a plurality of such prior art local image processors functioning together, by means of the chip expansion signal, to form a parallel processing system which can provide a higher speed of image processing than is possible with a single local image processor. This will be described referring to FIG. 3, which is a block circuit diagram illustrating two of such local image processors connected to operate in parallel. FIG. 4 is a corresponding waveform diagram, for describing the operation. In FIG. 3, each of the local image processors 10a, 10b, is coupled to receive as input signals the image signal, the image signal delayed by one horizontal scanning line of the source image, and the image signal delayed by two horizontal scanning lines, together with the system clock signal and the "program start" signal. In addition, the "program start" signal is transferred through a divide-by-two frequency divider circuit 11, and resultant output signals are supplied as a chip expansion signal to each of the local image processors 10a and 10b, so that the respective chip expansion signals that are supplied to the local image processors 10a, 10b will mutually differ in phase by 180°. The operational results that are produced from the local image processors 10a, 10b are combined in an OR gate 12, and outputted therefrom.

New data are written into the memory cells 7 of a local image processor 10a or 10b only when the chip expansion signal that is applied to that local image processor is at the "L" level. As a result, as illustrated in FIG. 4, input data shifts occur for local image processor 10a in the $(n-4)^{th}$, $(n-2)^{th}$, $n^{th}$, ... periods of the input image signal, with subsequent processing outputs being correspondingly indicated as the "processing output (a)", while input data shifts occur for local image processor 10b in the $(n-3)^{th}$, $(n-1)^{th}$, $(n+1)^{th}$, ... periods of the input image signal, with subsequent processing outputs being correspondingly indicated as the "processing output (b)". Thus in effect the local image processors 10a and 10b are processing in parallel two streams of local images, with the resultant processing results being combined in the OR gate 12 to obtain the final output results.

It is thus possible to combine a plurality of prior art local image processors of the type described above, to obtain a higher processing speed than is possible with a single local image processor. However such a prior art processor has various disadvantages. Since the only input information that is available to the processor during operation is the local image data, with no information being available concerning the location of a specific local image within the source image, it is not possible to vary the processing of a particular local image in accordance with the position of that local image within the source image. Furthermore when a plurality of successive source images are sequentially processed (e.g. successive frames or fields of a video signal) there is no information available to the local image processor to indicate the position, within that sequence of source images, of the source image which is currently being processed. Thus, it is not possible for the program stored in the program memory 3 to vary the processing that is applied to each source image (or to specific pixels of each source image) in accordance with the position of the source image within a sequence of source images. It is therefore not possible to execute, as a very simple example, such basic image processing operations as gradual fade-out of a video image that is generated from the output results.

In addition, with the type of image processing described above, each of successive local images is processed (during parallel operation of two or more local image processors) in an identical manner. The results of processing each local image are then generally used to determine a condition of a corresponding pixel of an output image that is generated based on the processing results.

However there is a type of image processing in which specific parameters of one or more regions within the source image (such as the total area, length of boundary, center position, etc.) are measured. This is required for example when data of an image showing a workpiece are to be utilized to control an industrial robot, e.g. with information concerning the position, shape etc. of the image region corresponding to the workpiece being obtained as the processing results. In order to achieve a sufficiently high speed of processing, it is preferable to execute two or more types of processing in parallel on each local image, e.g. to obtain area information and boundary length information etc. at the same time. It has not been possible to execute this type of multiprocessor operation with a prior art local image processor such as that described above.

For these reasons, such a prior art local image processor is lacking in flexibility and generality of application.

Moreover, although an enhanced processing speed can be obtained by connecting a plurality of such a prior art local image processors for operation together, the maximum processing speed that can be achieved is still not fully satisfactory for certain applications, and there is a requirement for a capability for achieving a higher processing speed. Specifically, intermediate computation results already obtained by one local image processor cannot be used in a computation which is being executed by another local image processor, so that large numbers of unnecessary computation steps are inevitable.

Further, if a plurality of such local image processors are to be formed upon a single integrated circuit chip, the problem arises that an excessively large number of circuit elements must be formed, due to the complex structure of each processor.

SUMMARY OF THE INVENTION

It is an objective of the present invention to overcome the disadvantages of the prior art set out above, by providing an image processor which is capable of a higher speed of operation than has been possible hitherto.

It is a further objective of the present invention to provide an image processor which has improved flexibility and generality of application, and which is highly suitable for multiprocessor operation with a plurality of such image procesors operating together.

It is moreover an objective of the present invention to provide an image processor having an architecture which is suitable for implementation in LSI (large-scale integrated circuit) form of a device which can, by itself, provide multiprocessor operation.

To achieve the above objectives, a preferred embodiment of a local image processor according to the present invention is formed of a plurality of local image processor elements, each having a local image memory, with a single shifter circuit containing shift registers being used in common to supply local image data to all of the processing elements. Since each of the local image processor elements can execute all of the functions of a prior art local image processor that is formed as a single processor element, and since only one shift register section is required for all of the processing elements, the overall number of circuit elements can be made sufficiently small to enable a plurality (e.g. four) of the processor elements to be formed on a single LSI integrated circuit chip. Thus the invention makes it possible to execute parallel image processing by a single-chip device.

More specifically, according to a first aspect a local image processor according to the present invention comprises:

local image shift register circuit means for holding as local image data successive ones of a plurality of local images of a source image, each of the local images comprising an array of pixels, and a plurality of local image processor elements, each of the local image processor elements comprising: local image memory means for periodically storing the local image data from the local image shift register circuit means;

computation circuit means for executing processing operations by utilizing local image data stored in the local image memory means;

program memory means for storing an image processing program and for generating output signals during execution of the program for controlling the processing operations and for selectively controlling transfer of data from the local image memory means to the computation circuit means; and program control circuit means for controlling the program memory means.

According to a second aspect, such a local image processor further comprises counter register means for holding a count value supplied from the processor control circuit means, representing a number of times that successive local images have been stored into the local image memory means, and the computation circuit means executes processing operations by utilizing that count value as well as the local image data stored in the local image memory means.

According to a third aspect, such a local image processor further comprises transfer register means for receiving from the computation circuit means data values representing intermediate results of processing operations executed by the computation circuit means and for holding the data values, and receiving register means for receiving from a transfer register means of another one of the local image processor elements data values representing intermediate results of processing operations executed by the other processor element and for holding these data values.

According to a fourth aspect, such a local image processor further comprises means for supplying to the program control circuit means a data value representing a restart address for the program memory means. The program control circuit means is configured such as to supply to the program memory means a sequence of addresses extending from a fixed initial address during a first execution of the image processing program, when processing of data of a local image begins, and to supply to the program memory means a sequence of addresses extending from the restart address during each of subsequent executions of the program.

According to a fifth aspect, the processor includes processor control circuit means which is selectively operable in first and second operation modes. Control signals from the processor control circuit means function during the first operation mode such that successive ones of the local images are sequentially supplied from the shift register circuit means to respective ones of the local image processor elements to be sequentially processed thereby, and function during the second operation mode such that each of successive local images is supplied in common to each of the local image processor elements to be concurrently processed thereby.

In the first operation mode, each of the local image processor elements will normally have an identical processing program stored therein, while in the second operation mode each of the processor elements will have a different processing program, thereby enabling various different parameters of a local image to be measured simultaneously.

The advantages over the prior art that are provided by the present invention can be summarized as follows:

(1) There is a substantial reduction in the number of circuit elements required to configure a plurality of image processor elements, since only a single shift register circuit is used in common for all of the image processor elements. It thus becomes possible to form a plurality of image p processor elements on a single integrated circuit chip, and to utilize these for parallel image processing.

(2) Each image processer element has available at all times a count value which represents the position within the source image of the local image that is currently being processed thereby, and which also represents (in the case of sequential processing of source images) the position within a sequence of source images of the source image which is currently being processed thereby. This information can be used to vary the type of image processing that is executed, in accordance with position within the source image and/or in accordance with the position of the source image in a source image sequence.

(3) During parallel processing operation, each image processing element can receive intermediate computation results that are generated by another image processor element. In this way, results that have already been computed by one image processor element can be utilized by another image processor element when necessary, to thereby eliminate unnecessary computations and so substantially increase the processing speed.

(4) A "restart" address value can be predetermined for the program memory, and each image processor element functions such that an initial program step (e.g. for initializing the contents of various data registers) is performed only when the processing program is first executed at the start of processing the data of a source image. Thereafter that initial step is skipped each time a local image is processed, with program execution beginning from the "restart" address. This serves to further increase the processing speed.

(5) The local image process can operate in either of two processing modes. In the first mode, respectively different local images are successively processed by the set of local image processing elements, i.e. with identical processing programs being executed by each of the elements. In the second mode, each local image processor element processes an identical local image, with respectively different programs being executed by the processor elements. This enables parallel operation for examining various features of an image, e.g. for simultaneously measuring the area, boundary length etc. of a specific object shape which appears in the source image.

DESCRIPTION OF PREFERRED EMBODIMENTS

Figure 5:
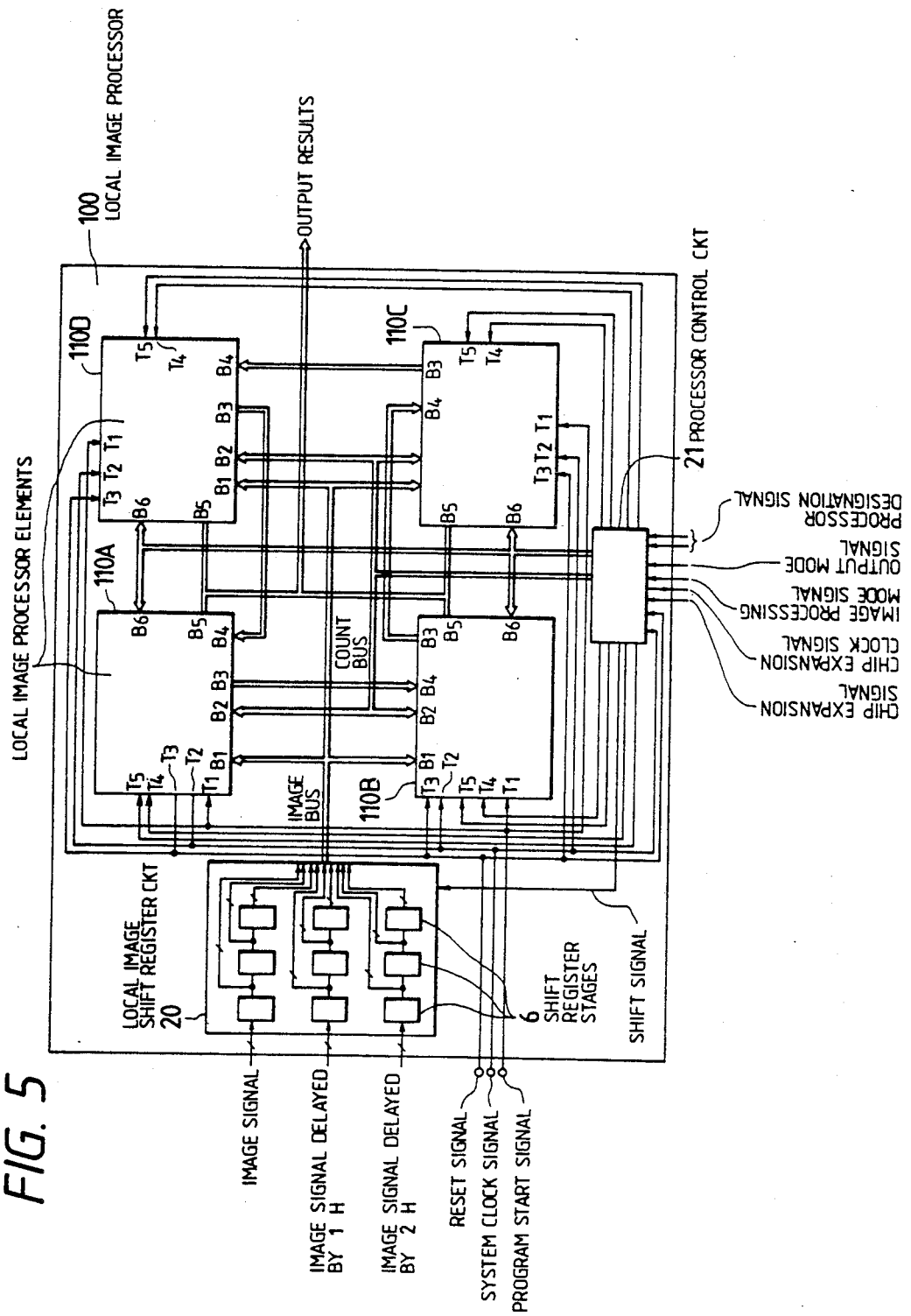
FIG. 5 is a block diagram of a preferred embodiment of a local image processor according to the present invention.

FIG. 5 is a block diagram of a preferred embodiment of a local image processor 100 according to the present invention, which is configured for processing local images each consisting of a 3×3 array of pixels. The processor 100 is formed on a single LSI chip, and contains a set of four local image processor elements 110A, 110B, 110C and 110D, each of which can execute the functions described hereinabove for the prior art example of a local image processor of FIG. 1, together with a variety of other new functions as described in detail hereinafter. The local image processor 100 further includes a local image shifting circuit 20 and a processor control circuit 21, with the processor control circuit 21 generating various control and timing signals which are supplied to each of the local image processor elements 110A, 110B, 110C, 110D, and a "shift" signal which is supplied to the local image shifting circuit 20. The local image shifting circuit 20 consists of a set of three shift registers which respectively receive as input signals the image signal (generated as described hereinabove as the data of successive pixels of a source image), the image signal delayed by one horizontal scanning line of the source image, and the image signal delayed by two horizontal scanning periods. Each of these shift registers consists of three shift register stages 6, each providing a delay which is equal to the period of one pixel of the image signal, i.e. the period of the "shift" signal is identical to the data period of the image signal, and the shift signal is synchronized with the image signal. Each pixel is represented in the image signal as a set of 8 bits, i.e. the image signal is an 8-bit parallel signal, so that in this embodiment each shift register stage 6 is actually a set of 8 parallel stages. However the invention is equally applicable to a 2-state (1-bit serial) image signal in which each pixel is either black or white.

The processor control circuit 21 receives from an external source (e.g. a system controller) a system clock signal which determines the timing of various signals generated in the local image processor, a reset signal, a program "start" signal, a chip expansion signal, an image processing mode signal, an output mode signal, and a processor designation signal, which are respectively described hereinafter.

Figure 6:
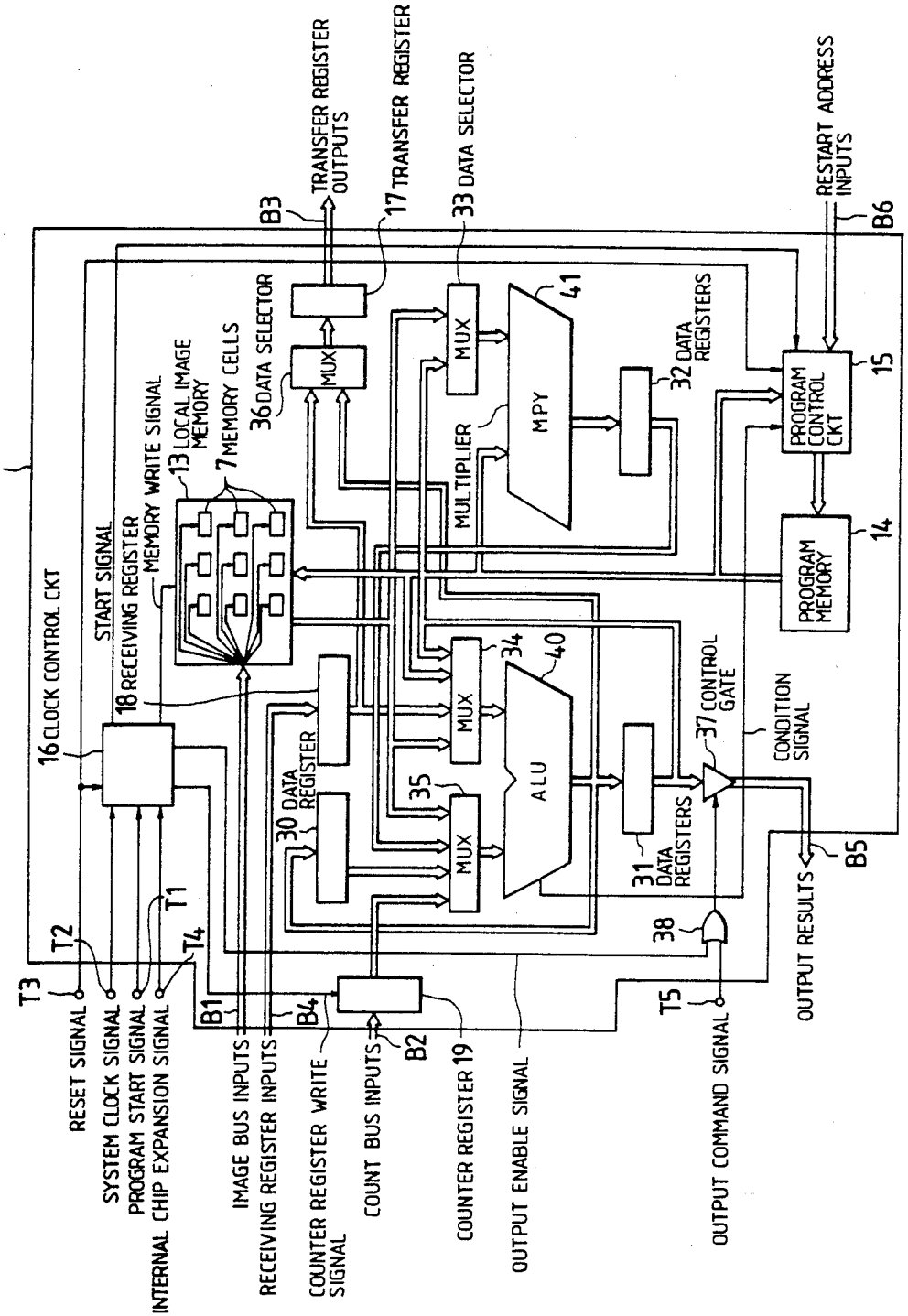
FIG. 6 is a circuit block diagram of one local image processor element of the embodiment of FIG. 5.

FIG. 6 shows the internal configuration of each of the local image processor elements 110A, 110B, 110C, 110D, these being mutually identical. This consists of a local image memory 13, a program memory 14, a clock signal control circuit 16, a transfer register 17, a receiving register 18, a counter register 19, data registers 30, 31 and 32, data selectors 33, 34, 35, 36, an ALU (arithmetic and logic unit) 40, a multiplier circuit 41, a control gate 37, and an OR gate 38. The local image memory 13 is formed of an array of nine memory cells 7 (each of which stores 8 bits), with the image data of respective pixels of a local image being written into corresponding ones of these memory cells 7 under the control of a memory write signal which is supplied from the clock signal control circuit 16. The image data are supplied from the local image shifting circuit 20 via an image bus, through a set of input terminals B1. The data contents of the memory cells 7 are selectively outputted to the data selectors 33, 34, 35 under the control of output signals produced from the program memory 14, as determined by the contents of a current step of the program stored in the program memory 14. The ALU 40 executes various operations such as addition, subtraction and logic operations on the data that are transferred thereto from the data selectors 34 or 35, while the multiplier circuit 41 performs multiplication operations on data transferred thereto by the data selector 33, with the multiplication factor being supplied from the program memory 14. Such addition, subtraction, multiplication and logic operations will be collectively referred to as computation operations. The data register 31 holds the results of computation operations generated from the ALU 40, while the data register 32 holds the holds the results of computation operations generated from the multiplier circuit 41.

The control gate 37 outputs therefrom (to a set of output terminals B5) the computation results held in the data register 31, in response to an "output enable" signal (supplied from an input terminal T5) that is produced from the clock signal control circuit 16 and transferred through the OR gate 38, or an output command signal supplied from the processor control circuit 21 and transferred through OR gate 38.

The program memory 14 has stored therein a program which determines the image processing that is to carried out. Initiation of program execution and transfer to the program memory 14 of successive program addresses is performed by the program control circuit 15. Command signals produced from the program memory 14 during each program step serve to control the readout of image data from the local image memory 13, and also control the data registers 30, 31, 32, the data selectors 33 to 36, the ALU 40, the multiplier circuit 41, the transfer register 17, and the receiving register 18. A "condition" signal generated from the program memory 14 in accordance with results of a computation is supplied to the program control circuit 15, to determine the value of the next address that is to be supplied from the program control circuit 15, so that conditional jump operations can be executed.

Operation of the program control circuit 15 is initiated by a "start" signal which is produced from the clock signal control circuit 16. At this time the program control circuit 15 supplies an initial address value to the memory 14 and thereafter generates successive address values on each falling edge of the "start" signal. If a "restart" data value (supplied from input terminals B6 and described hereinafter) is other than zero, then after the first complete execution of the program stored in the program memory 14 (i.e. after the first local image has been processed at the start of processing operations) the next execution of the program begins from the address number that is equal to the "restart" value. In this way, initializing of the contents of various data registers of a local image processing element is performed only once, when the program step of address 0 is executed at the start of processing the source image, and the initialization step (or plurality of initializing steps) is skipped thereafter.

The clock signal control circuit 16 of each of the local image processor elements 110A, 110B, 110C, 110D is controlled by output signals produced from the processor control circuit 21 of the local image processor, and produces output signals which respectively control image data write-in to the local image memory 13, and writing count values into the counter register 19. The clock control circuit 16 receives the reset signal, system clock signal and program start signal via input terminals T3, T2 and T1 respectively. The clock signal control circuit 16 also produces the "output enable" signal that is supplied to the OR gate 38, to control the outputting of computation result data from the data register 31 via the control gate 37.

Each local image processor element is also coupled to receive, from the processor control circuit 21, a count value (described hereinafter) which is supplied via a count bus to a set of input terminals B2.

The receiving register 18 of each of the local image processor elements 110A, 110B, 110C, 110D is coupled via a bus and a set of input terminals B4 to receive the contents of the transfer register 17 of another one of the local image processor elements, as can be understood from FIG. 5. The contents of the transfer register 17 of a processor element are supplied to a set of output terminals B3. That is, the receiving register 18 of the local image processor element 110A is coupled to receive the contents of the transfer register 17 of the local image processor element 110D, the receiving register 18 of the local image processor element 110B is coupled to receive the contents of the transfer register 17 of the local image processor element 110A, the receiving register 18 of the local image processor element 110C is coupled to receive the contents of the transfer register 17 of the local image processor element 110B, and the receiving register 18 of the local image processor element 110D is coupled to receive the contents of the transfer register 17 of the local image processor element 110C. As described in detail hereinafter, the receiving register 18 and transfer register 17 in each local image processor element can thereby be utilized for transferring intermediate computation results generated within one of the local image processor elements 110A, 10B, 110C, 110D to be utilized in a computation that is executed by another one of the processor elements, to thereby enable the overall processing speed to be substantially increased for certain types of processing.

The three shift registers of the local image shifting circuit 20 execute successive shift operations in parallel with one another, in response to the "shift" signal that is supplied from the processor control circuit 21. After each shift operation, to transfer data of a new set of three pixels (of three successive horizontal scanning lines) into the local image shifting circuit 20, the (3 by 3 pixel) local image data that now appear at the outputs of the shift register stages 6 are transferred over an image bus to each local image memory 13 of the local image processor elements 110A, 110B, 110C, 110D, and are written therein in parallel by the memory write signal. That is, the data of each pixel of the local image are written into a corresponding one of the memory cells 7 of the local image memory 13, in each local image processor elements 110A, 110B, 110C, 110D.

Each of the local image processor elements 110A, 110B, 110C, 110D is controlled by signals produced from the processor control circuit 21 of the local image processor. Specifically, when an internal chip expansion signal that is supplied from the processor control circuit 21 to one of the local image processor elements 110A, 110B, 110C, 110D is at the "H" level and the "program start" signal (supplied from the processor control circuit 21 to the clock signal control circuit 16 of that local image processor element is at to the "H" level, then a "start" signal that is produced from the clock signal control circuit 16 of that local image processor element goes to the "H" level on the next rising edge of the system clock signal, and returns to the "L" level on the succeeding rising edge of the system clock signal. On the falling edge of such a "start" signal pulse, execution of the processing program by that local image processor element is started (i.e. either address 0 or the "restart" address is sent from the program control circuit 15 to the program memory 14 of that processor element).

The processor control circuit 21 is supplied with an image processing mode signal (from an external source, e.g. a system control processor). When that image processing mode signal is at the "H" level, the processor control circuit 21 periodically generates internal chip expansion signals which go successively to the "H" level as described above, and which are respectively supplied (from an input terminal T4) to the clock signal control circuit 16 of each of the local image processor elements 110A, 110B, 110C, 110D. These internal chip expansion signals are illustrated for example in FIG. 13, described in detail hereinafter. The internal chip expansion signals are generated by the processor control circuit 21 based on the system clock signal and the "program start" signal (each of which is synchronized with the image signal data periods). The internal chip expansion signals that are respectively supplied to the local image processor elements 110A, 110B, 110C, 110D are correspondingly designated by the letters A, B, C and D respectively in FIG. 13. As shown, the internal chip expansion signal A goes to the "H" level on a falling edge of the "program start" signal, the internal chip expansion signal B goes to the "H" level on the next falling edge of the "program start" signal while the internal chip expansion signal A returns to the "L" level, and so on for the internal chip expansion signals B, C and D sequentially, i.e. four successive internal chip expansion signal "H" level pulses are generated as shown. As described above and shown in FIG. 13, the "start" signal of each of the local image processor elements 110A, 110B, 110C, 110D goes to the "H" level for one period of the system clock signal when the corresponding one of the internal chip expansion signals goes to the "H" level and the program start signal is also at the "H" level, with processing being thereafter executed by that local image processor element in accordance with the program stored therein.

Figure 13:
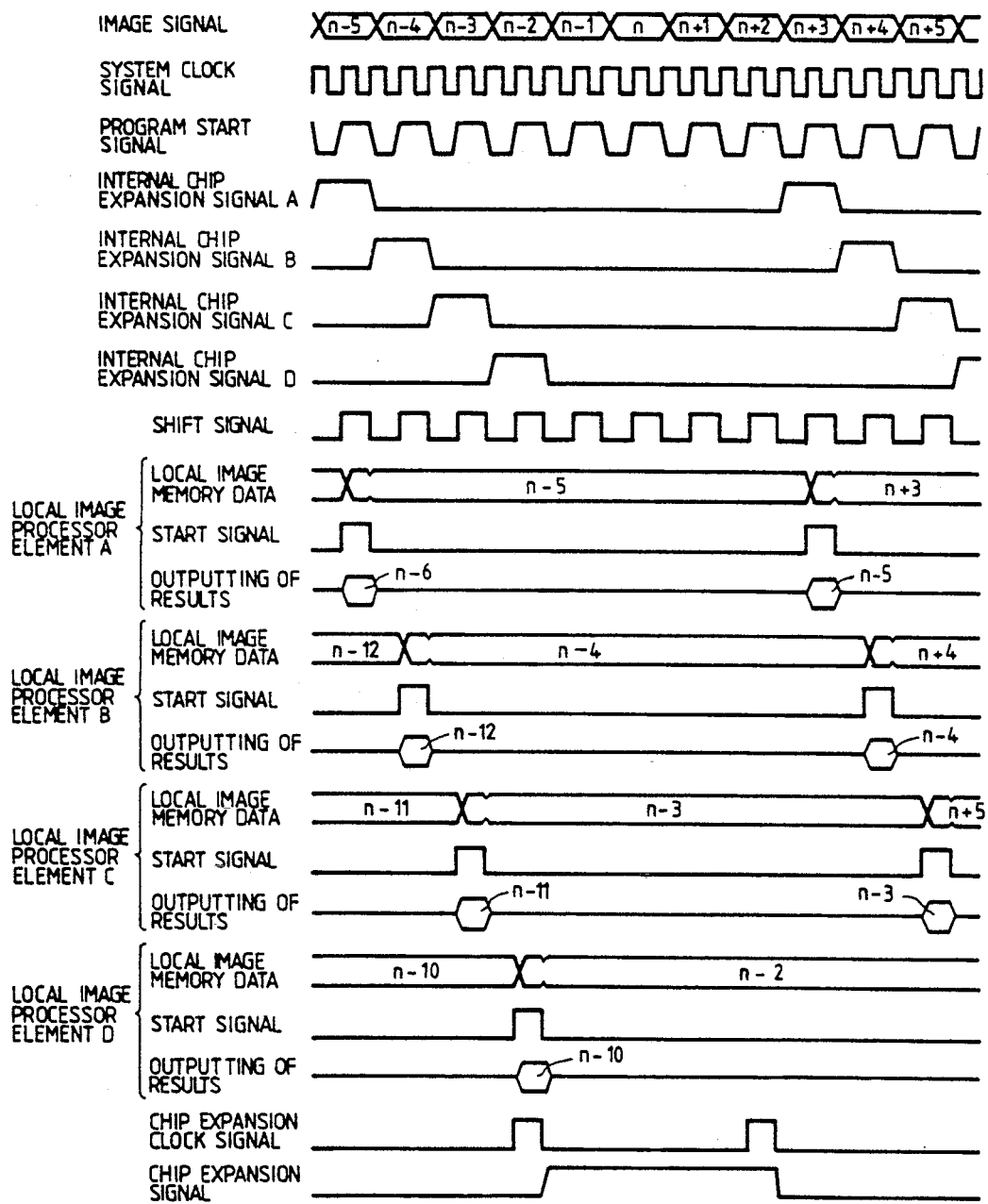
FIGS. 13 and 14 are waveform diagrams for describing the operation of a processor control circuit of a local image processor element.

The processor control circuit 21 also outputs a chip expansion clock signal, to be utilized by an external control device for generating a chip expansion signal that is supplied to the processor control circuit 21. Such chip expansion signals can be used to operate a plurality of such local image processors 100 in parallel, for increase processing speed, in addition to the use of the four local image processor elements in parallel within each local image processor 100. As shown in FIG. 13, the chip expansion clock signal has a period which is four times that of the "shift" signal, and is synchronized in phase with the "start" signal that is generated within the local image processor element 110D. The chip expansion clock signal is supplied to the external control device (e.g. system controller), and if a plurality of such local image processors 100 are to execute parallel processing, the external control device supplies respective chip expansion signals to these local image processors.

While the chip expansion signal supplied to a local image processor is at the "H" level, as illustrated in FIG. 13, generation of internal chip expansion signals within that local image processor is inhibited, so that the program start signals that are supplied to each of the local image processor elements 110A, 110B, 110C, 110D of that local image processor are each held at the "L" level, and hence no new processing program executions can be initiated until the chip expansion signal returns to the "L" level. FIG. 13 illustrates the case in which two local image processors are used in parallel. When the chip expansion signal supplied to a first local image processor is at the "L" level, successive "start" signal pulses are generated for successively initiating program execution by each of the local image processor elements 110A, 110B, 110C, 110D of that local image processor, while at the same time the chip expansion signal supplied to the second local image processor is held at the "H" level, so that processing that has previously been initiated in that second local image processor is continued. It will be apparent that in this case the chip exansion signals can be generated very simply, e.g by using a single bistable element as in the prior art example of FIG. 3 above.

In this way, as shown in FIG. 13, the local images that are updated in the $(n-5)^{th}$, $(n-3)^{th}$, $(n-4)^{th}$ and $(n-5)^{th}$ periods of the image signal are respectively processed by the local image processor elements 110A, 110B, 110C, 110D of the first local image processor, with that processing being initiated while the chip expansion signal applied to that first local image processor is at the "L" level, whereas the local images that are updated in the $(n-1)^{th}$, $n^{th}$, $(n+1)^{th}$ and $(n+2)^{th}$ periods of the image signal are respectively processed by the local image processor elements 110A, 10B, 110C, 110D of the second local image processor, with that processing being initiated while the chip expansion signal applied to the first local image processor is at the "H" level. Thus, one set of four sequentially inputted local images (from the local image shifting circuit 20) are processed by the first local image processor, the next set of four local images are processed by the second local image processor, the next set are processed by the first local image processor, and so on, with parallel operation of the two local image processors being achieved. In addition, as will be clear from FIG. 13, parallel processing is also being executed by the four local image processor elements within the first local image processor and also by the four local image processor elements within the second local image processor.

It will be apparent that such parallel operation can be extended to a greater number of local image processors, in a similar manner to that described above.

It can thus be understood that it is a first basic feature of the present invention that:

(a) A single local image processor, which contains a plurality of local image processor elements, can by itself execute parallel processing operation. Moreover, since a single local image shifting circuit 20 is used in common for all of the local image processor elements of a local image (i.e. with each shift register stage being coupled to a plurality of memory cells of respective local image processor elements, rather than coupling each shift register stage to a single memory cell as in the prior art) the number of circuit elements of the local image processor can be substantially reduced by comparison with a prior art local image processor. This is an important feature, and enables the number of circuit elements of each local image processor element to be made sufficiently small to enable a local image processor consisting of, for example four local image processor elements, to be configured on a single IC chip. Thus the invention enables high-speed parallel local image processing to be achieved by a one-chip device.

(b) In addition, a plurality of such local image processors can be mutually connected for parallel operation, again in a very simple manner, i.e. by sequentially setting the chip expansion signals supplied to the respective local image processors to the "H" level. Thus for example, two local image processor IC chips can be used to achieve a level of parallel processing that in the prior art has in general required the use of eight separate local image processors IC chips.

Figure 7:
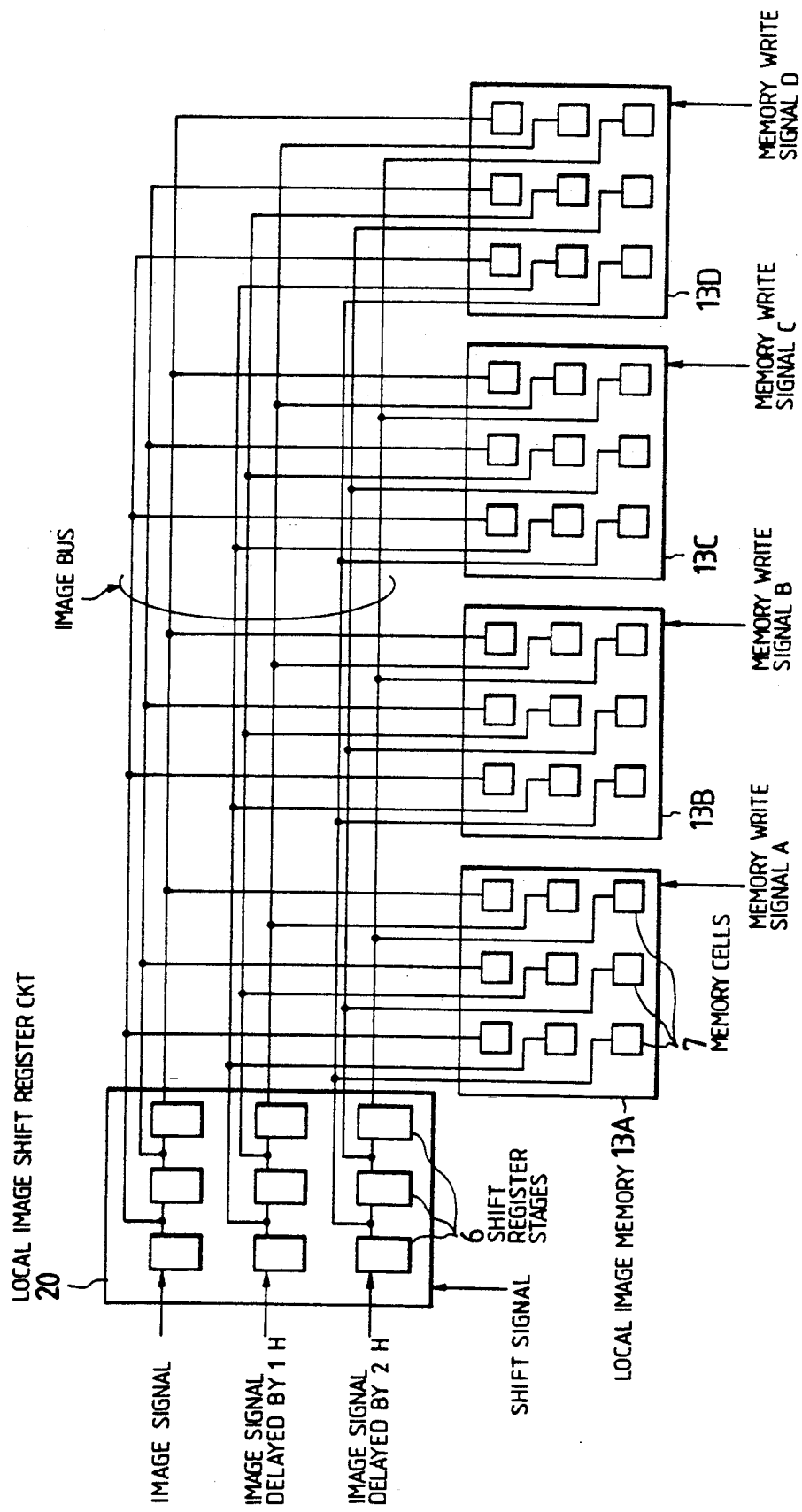
FIG. 7 is a circuit block diagram showing the configuration of a local image shift register circuit and a set of four memory cells of the embodiment of FIG. 5.
Figure 8:
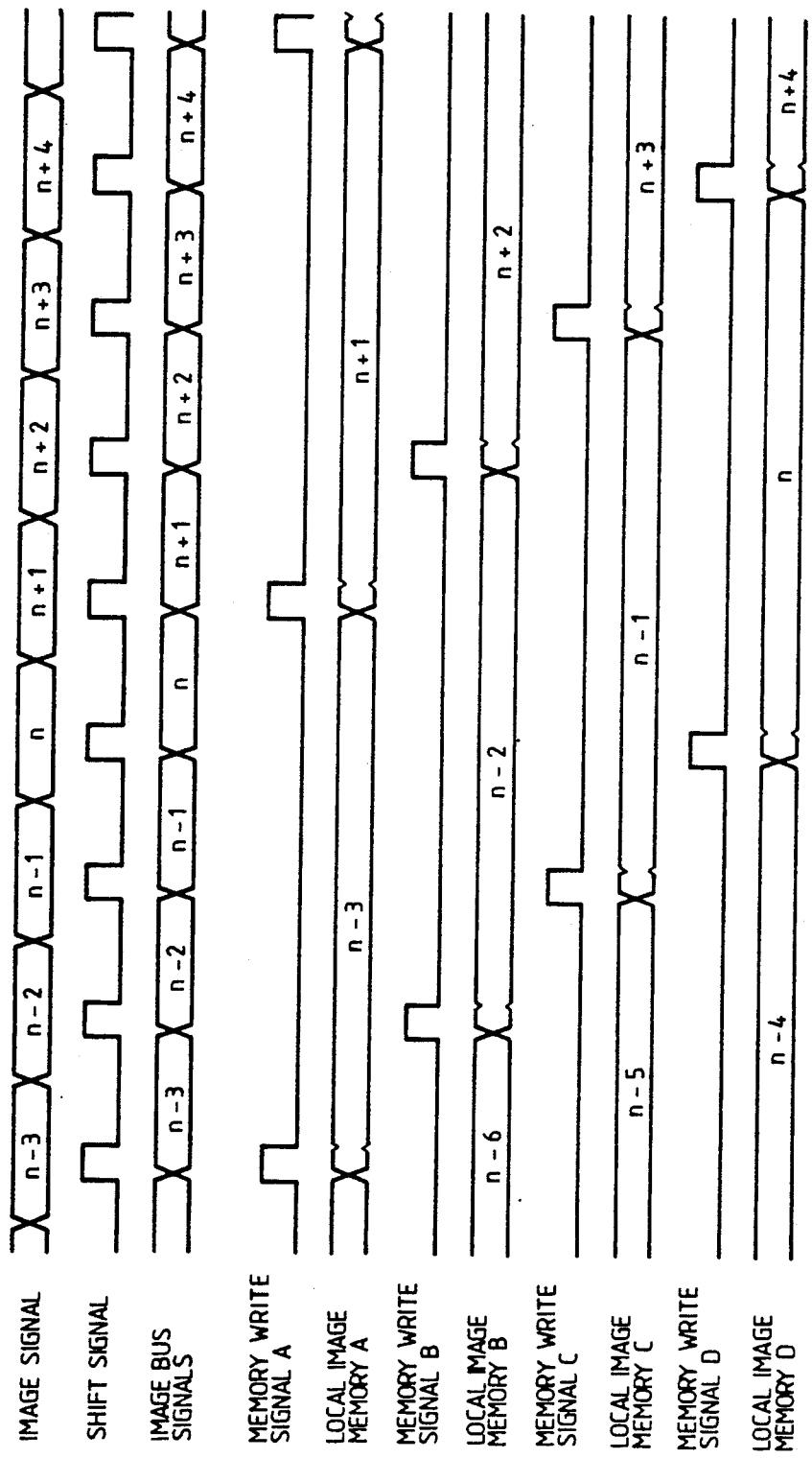
FIG. 8 is a waveform diagram for describing the operation of the circuits of FIG. 7.

The operation of the shift register and memory cell circuits will be further described referring to the circuit diagram of FIG. 7, which shows only the local image shifting circuit 20 and the local image memories of the local image processor elements 110A, 110B, 110C, 110D, designated as 13A, 13B, 13C and 13D respectively. It will be assumded that the level of the image processing mode signal supplied to the processor control circuit 21 is such that the processor 100 functions in a first operation mode, in which successive local images are supplied to respectively different ones of the processor elements. FIG. 8 shows the operating waveforms for FIG. 7. Data for a new set of three pixels are shifted into the local image shifting circuit 20 (to provide an updated 3 by 3 element local image) on each rising edge of the "shift" signal that is produced from the processor control circuit 21, and the data for the 9 pixels of this local image are transferred via the image bus to each of the local image memories 13A to 13D. On each falling edge of the memory write signals A to D, supplied respectively to the local image memories 13A to 13D, the current local image data are transferred from the local image shifting circuit 20 into the corresponding local image memory, as shown in FIG. 8, so that data of the respective pixels of that local image are written into corresponding memory cells 7 of that local image memory. These data are thereafter held in the memory cells 7 until the next falling edge of the memory write signal.

Figure 1:
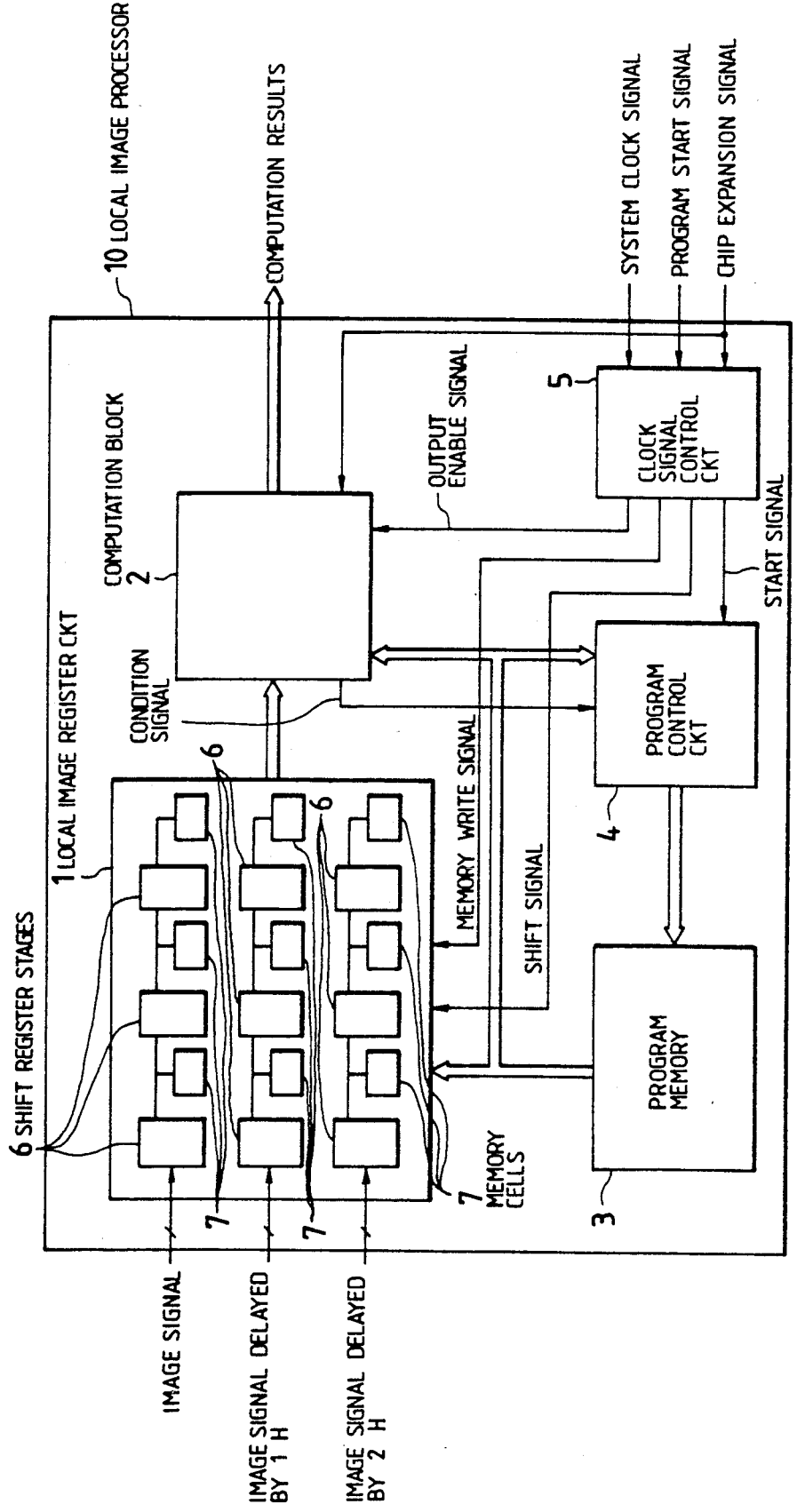
FIG. 1 is a block diagram of a prior art local image processor.
Figure 2:
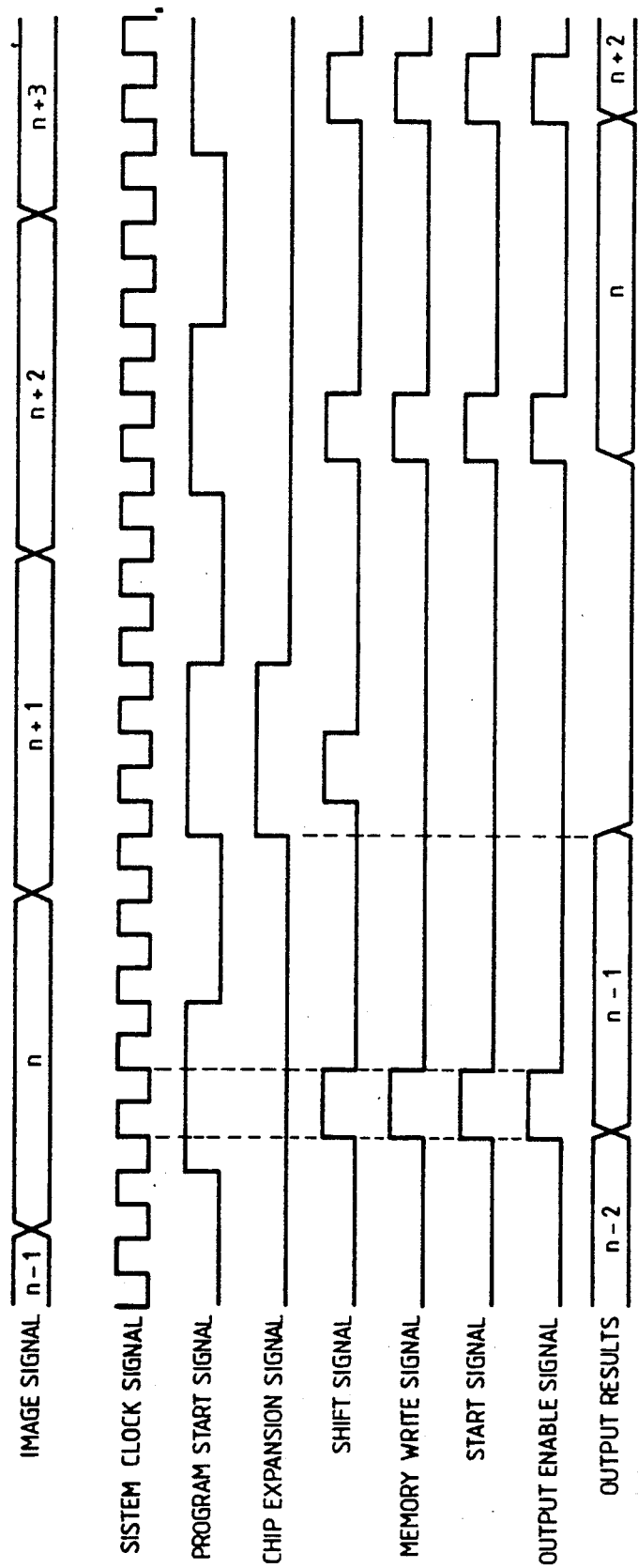
FIG. 2 is a waveform diagram for describing the operation of the local image processor of FIG. 1.

It can thus be understood that an identical effect can be obtained to that of the prior art local image shift register circuit 1 of FIG. 1 described above, but with only one set of shift register stages being required to store respective local images in each of the four local image memories 13A to 13D. Thus, the number of circuit elements required to implement this function is substantially reduced by comparison with the prior art.

Figure 14:
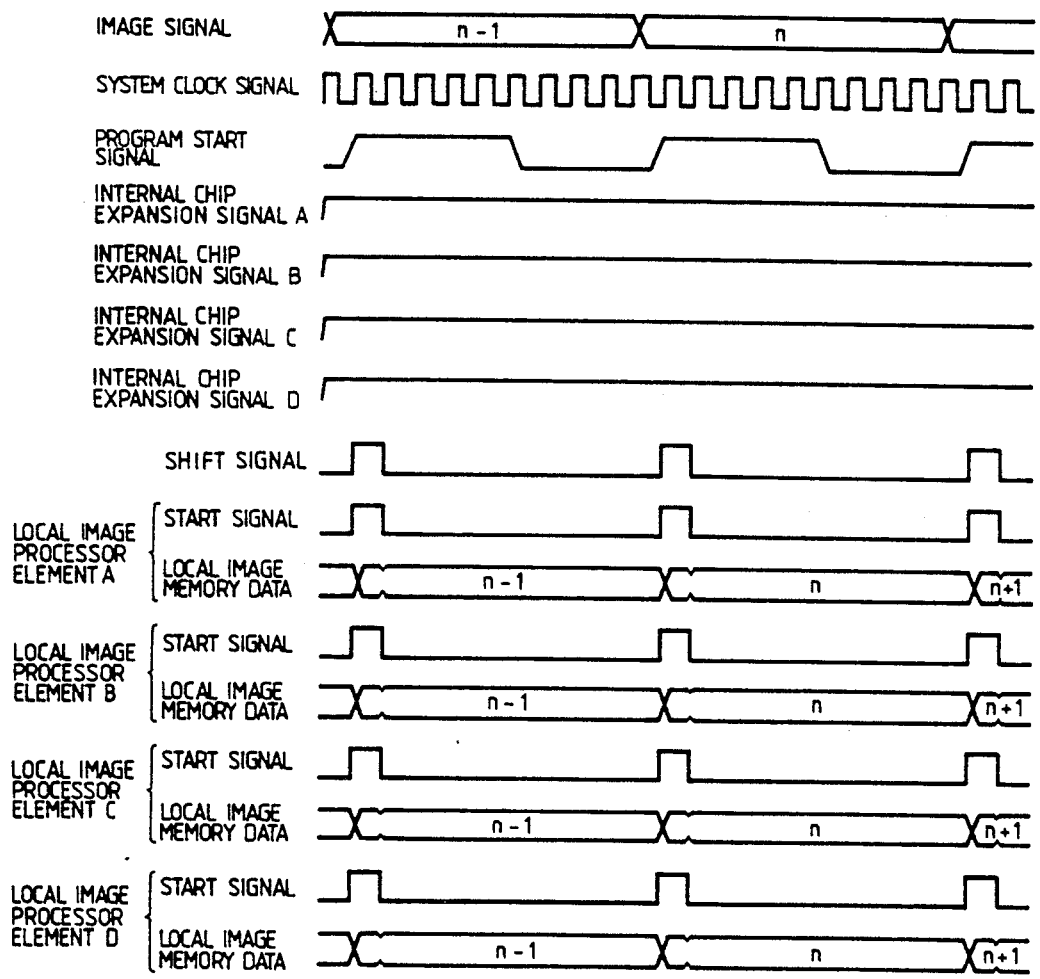

The above description has been given for the first mode of operation of the local image processor 100, which occurs when the image processing mode signal (supplied to the processor control circuit 21 from an external controller) is at the "H" level. When that image processing mode signal is set to the "L" level, a second mode of operation is entered, in which the internal chip expansion signals A to D from the processor control circuit 21 are each fixedly held at the "H" level (so long as the chip expansion signal supplied to the processor 100 is held at the "L" level). In this mode as illustrated in the waveform diagram of FIG. 14, each of the start signals supplied to the local image processor elements 110A, 110B, 110C, 110D goes to the "H" level in mutual synchronism, when the "program start" signal goes to the "H" level. Thus in this mode an identical updated local image is set into the local image memory 13 of each of the local image processor elements 110A, 110B, 110C, 110D each time a rising edge of the "shift" signal occurs. Thus, the respective programs that have been stored in the program memories 14 of the local image processor elements are all executed concurrently, and act on an identical set of local image data. In this way it is possible to store respective programs for recognizing specific features of one source image, as described in detail hereinafter, and to execute these programs in parallel at high speed, to thereby complete the examination of one source image in a very short time. In this case, the processing result obtained by the local image processor elements 110A, 110B, 110C, 110D are sequentially outputted after processing of the entire source image has been completed. Specifically, the "output mode" signal that is supplied to the 21x from an external controller is normally held at the "L" level. When a complete source image has been processed in this second mode of operation, the "output mode" signal is set to the "H" level. In that condition, four successive data values are sequentially inputted (from the external controller) as the "processor designation" signal to the processor control circuit 21. As a result, assuming for example that these values are successively 1, 2, 3 and 4, then the output command signal that is supplied from the processor control circuit 21 to the OR gate 28 of the local image processor element 110A goes to the H level in response to the processor designation value 1, whereupon the processing results held in the data register 31 of that local image processor element are outputted from the control gate 37. The same operation is thereafter successively repeated for each of the local image processor elements 110B to 110D, in response to the processor designation values 2, 3 and 4 respectively being supplied while the output mode signal is at the "H" level, to sequentially output the processing results obtained by each of these processor elements.

During the first operating mode, as shown in FIG. 13, the processing results computed by a processor element for a local image are outputted in response to the "H" state of the output enable signal (i.e. while the "start" signal is at the "H" level) immediately prior to the start of processing the next local image by that processor element.

Figure 9:
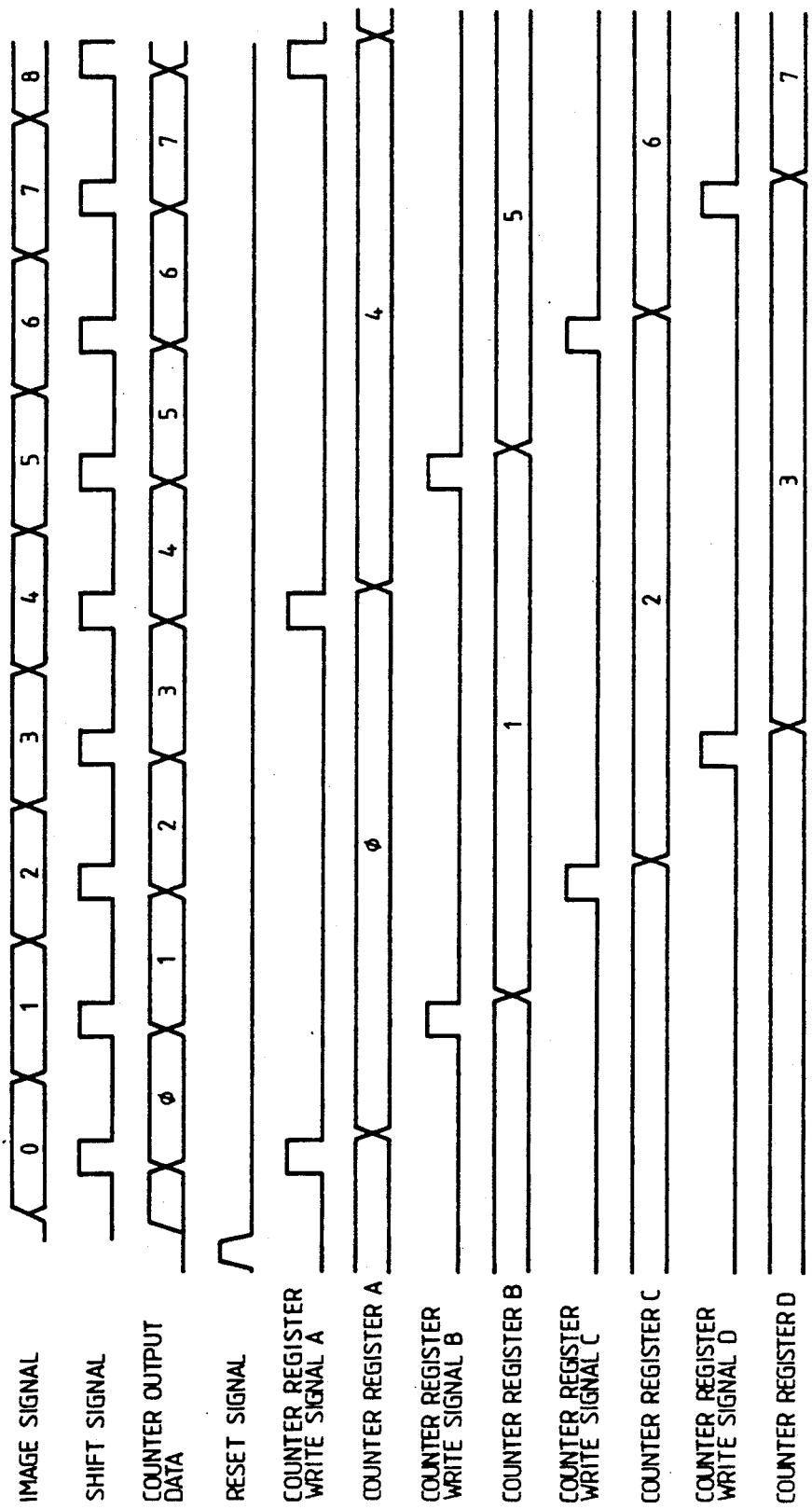
FIG. 9 is a waveform diagram for describing the operation of a counter register of one local image processor element of the local image processor of FIG. 5.

A second basic feature of the invention will be described, referring to FIGS. 5, 6 and 9. This feature provides each of the local image processor elements 110A, 110B, 110C, 110D with information indicating the position within the source image of the local image that is currently being processed by that local image processor element, and also, when a plurality of source images are being sequentially processed, indicating the position within that sequence of the source image that is currently being processed by that local image processor element.

With a prior art local image processor, the only information that is available to the processor concerning the local image that is currently being processed is the local image itself (i.e. the pixel data of that local image). Thus it is not possible to modify the processing in accordance with the position within the source image of a local image that is currently being processed, or in accordance with the position within a plurality of sequentially supplied source images of a source image that is currently being processed. However with the preferred embodiment of the present invention, each of the local image processor elements 110A, 110B, 110C, 110D contains an internal counter register 19, which holds a count value representing the position within the source image of the local image that is currently being processed by the local image processor element, and also representing the position within a sequence of local images of the local image that is currently being processed.

The operation is as follows. The processor control circuit 21 contains a counter circuit whose contents are incremented once in each data period of the image signal, e.g. on each rising edge of the "shift" signal, with the count value beginning from zero when the reset signal supplied from an external controller to the processor control circuit 21 goes to the "H" level at the start of processing operation. This count value is transferred via a counter bus as shown in FIG. 5 to inputs of each counter register 19 of the local image processor elements 110A, 110B, 110C, 110D. A counter register write signal (which can be identical to the memory write signal) is generated by the clock signal control circuit 16 of each local image processor element and supplied to the corresponding counter register 19, with the count value from the counter bus being written into that counter register 19 on each falling edge of that counter register write signal. Thus, each time a new local image is written into the local image memory 13 of a local image processor element, a count value representing the position of that local image within the processing sequence is stored in the counter register 19 of that local image processor element.

More specifically, when the reset signal is set to the "H" level at the start of processing operation, the aforementioned counter within the processor control circuit 21 is first reset to its maximum count value, and then goes to a count of zero on the first rising edge of the "shift" signal to occur thereafter. Thereafter, the count value is successively incremented by one each time that a local image data shift operation occurs. Thus, on the first falling edge of the counter register write signal A (generated by the clock signal control circuit 16 of local image processor element 110A), a value of 0 is written into the counter register 19 of that local image processor element, and is held therein until the next falling edge of the counter register write signal A (i.e. until a new local image is written into the local image memory 13 of that local image processor element), whereupon the current count value of 4 is written into that counter register 19. Similar operations are executed for each counter register 19 of the local image processor elements 110B, 110C and 110D, in response to the counter register write signals B, C and D respectively, as shown in FIG. 9, with the initial count values that are written into the counter register 19 of these local image processor elements being 1, 2 and 3 respectively. In this way, while each of the local image processor elements 110A, 110B, 110C, 110D is processing the data of a local image, information indicating the position of that local image within the pixel data stream is available to the processor element.

As a specific example, assuming that the source image is divided into an array of 256 by 256 pixels, then the lower-significance 8 bits of the count value held in a counter register 19 of a local image processor element will represent the position of the latest pixel to be incorporated into the local image that is currently being processed by that processor element (i.e. the upper leftmost pixel position in that local image), as counted along the horizontal scanning direction. The ninth to sixteenth bits (counting from the least significant bit) of that count value will represent the position of that latest pixel as counted along the vertical scanning direction. The bits extending from the seventeenth bit (counting from the LSB) to the most significant bit will represent the number of the source image whose pixels are currently being processed.

In this way, numeric values representing the position within the source image of the pixels (i.e. local image) that are currently being processed by a local image processor element, and the position of that source image within a plurality of source images that are sequentially processed, are available as respective numeric values held in the counter register 19 of that local image processor element.

As shown in FIG. 5, the contents of the counter register 19 of each local image processor element are supplied to inputs of the data selector 30, and hence can be selectively transferred to the ALU 40 under the control of command signals from the program memory 14. These numeric values can thus be used in conjunction with the program that is stored in the program memory 14, i.e. to vary the contents of processing in accordance with the source image position of the local image that is currently being processed, and/or in accordance with the position of the source image from which the local image is obtained. It will be understood that this is an extremely valuable feature, which enables greatly enhanced flexibility of operation and wider range of applications of such a local image processor.

Figure 10:
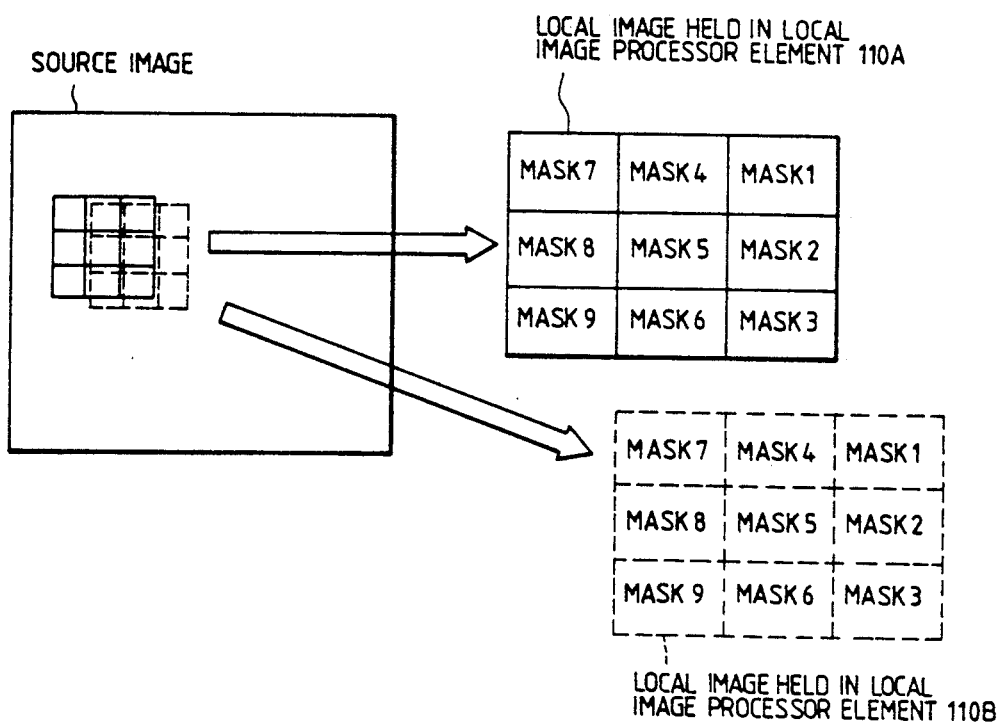
FIG. 10 is a conceptual diagram for illustrating how pixel data are held in the local image memory cells of a local image processor element shown in FIG. 5.

A third basic feature of the present invention will be described, whereby increased speed of processing can be achieved by transferring intermediate results of computations or logic operations obtained by one local image processor element to another one of the local image processor elements to be used thereby. With a prior art type of local image processor, a relatively high processing speed can be obtained, particularly if parallel operation of two or more local image processors is utilized. However even higher speeds are required for some applications. With the local image processor embodiment 100, each of the local image processor elements 110A, 110B, 110C, 110D is provided internally with a receiving register 18 and a transfer register 17, which can be used to transfer intermediate processing results from one local image processor element to be used by another. This will be described referring first to the conceptual diagram of FIG. 10. Here it is assumed that sequential processing of successive local images is being executed by the local image processor elements 110A, 110B, 110C, 110D as described hereinabove. At some point in time, the condition will be as shown in FIG. 10, with the data contents of the memory cells 7 of the local image memory 13 of the local image processor element 110A (whose contents correspond to the set of pixels shown as a full-line grid in the source image) being designated as MASK 1 to MASK 9 respectively. Similarly, the contents MASK 1 to MASK 9 of the local image memory 13 of the local image processor element 110b correspond to the set of pixels of the source image shown as a broken-line grid. It can be understood from the preceding description that the contents of the local image memory 13 of the local image processor element 110B and the contents of the local image memory 13 of the local image processor element 110A will mutually partially overlap, as shown in FIG. 10, since the local image region is in effect being scanned across the source image. Similarly, at any specific point in time, the contents of the local image memory 13 of the local image processor element 110C and the contents of the local image memory 13 of the local image processor element 110B will mutually partially overlap, and the contents of the local image memory 13 of the local image processor element 110D and the contents of the local image memory 13 of the local image processor element 110D will also mutually partially overlap, in the same way as shown in FIG. 10.

As shown, each of the set of memory cell addresses MASK 1 to MASK 9 corresponds to a set of 3 pixels along the horizontal direction (of the source image) by three pixels along the vertical direction. It will be assumed for example that identical processing is to be executed by each of the local image processor elements 110A, 110B, 110C, 110D, and that this consists of adding together the contents of the memory cell addresses MASK 1 to MASK 6, i.e. to obtain the sum of the data values of an array of 2 pixels along the horizontal direction by 3 pixels along the vertical direction. It will be assumed that this is executed by first adding together the contents of the memory cell addresses MASK 1 to MASK3, to obtain a first intermediate computation result, then to add together the contents of the addresses MASK4 to MASK6 to obtain a second intermediate computation result, and then to add together these two intermediate results. It will be apparent that at the time when the local image processor element 110B is to execute addition of the contents of MARK 4 to MARK 6 (which of course are respectively identical to the contents MASK 1 to MASK 3 of the local image processor element 110A), that addition result will already be available, as the aforementioned first intermediate computation result which has been generated within the local image processor element 110A. Thus if that intermediate result can be used by the local image processor element 110B, an increased processing speed can be achieved. This is done by using the aforementioned transfer register 17 and receiving register 18 in each local image processor element.

Figure 11:
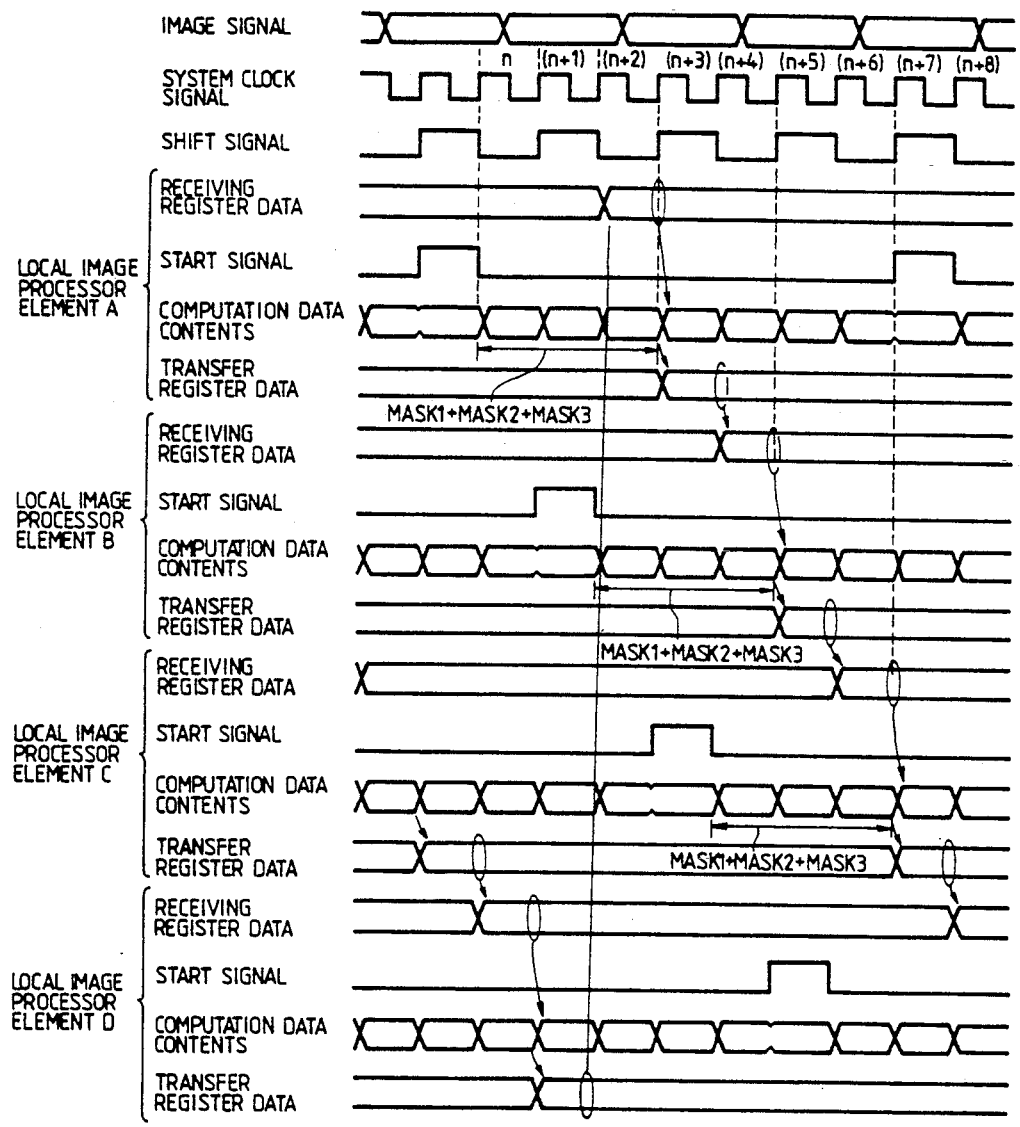
FIG. 11 is a a waveform diagram for describing the operation of a transfer register and a receiving register of a local image processor element.

The operation will be described referring to the waveform diagram of FIG. 11. Each time that an "H" level pulse of the "start" signal produced by the clock signal control circuit 16 of local image processor element 110A occurs, the program control circuit 15 thereafter supplies three successive address values (e.g. address 1 to address 3) to the program memory 14, and the corresponding program steps are thereby sequentially executed. In these three program steps (occurring in the system clock periods designated as n, (n+1) and (n+2) in FIG. 11) the contents of MASK 1, MASK 2 and MASK 3 are read out from the local image memory 13 or processor element 110A, and added together by the ALU 40, i.e. the MASK 1 data are first read out, then the contents of MASK 2 are read out and added to the MASK 1 data, then (in the third program step) the contents of MASK 3 are read out and added to the result obtained. The intermediate computation result that has thus been obtained (i.e. the sum of the contents of MASK 1, MASK 2 and MASK 3) is then transferred through the data selector 36 to be written into the transfer register 17 of the local image processor element 110A (in system clock period (n+3)).

When an "H" level "start" signal pulse is next generated by the clock signal control circuit 16 of the local image processor element 110B, an identical sequence of operations is executed by the local image processor element 110B, to obtain the sum of the contents of the memory cell addresses MASK 1, MASK 2 and MASK 3 of that local image processor element (in the system clock periods (n+2), (n+3) and (n+4)). That intermediate result is obtained during the third system clock period (n+4) following the "H" level "start" signal pulse. However in that system clock period (n+4), the intermediate result held in the transfer register 17 of the local image processor element 110A is transferred into the receiving register 18 of the local image processor element 110B, so that in the fourth system clock period following the aforementioned start signal pulse of local image processor element 110B (i.e. in system clock period (n+5)), that intermediate result is transferred through the data selector 34 at the same time that the contents of data register 30 (i.e. the sum of the contents of MASK 1, MASK 2 and MASK 3 of local image processor element 110B) are transferred through data selector 35. The two intermediate results are thereby added together by the ALU 40, to obtain a value which is the sum of the required 2 by 3 pixel data values.

In a similar manner, an intermediate result obtained by the local image processor element 110B can be transferred from the transfer register 17 of that local image processor element to the receiving register 18 of the local image processor element 110C, an intermediate result obtained by the local image processor element 110C can be transferred from the transfer register 17 of that local image processor element to the receiving register 18 of the local image processor element 110D, and an intermediate result obtained by the local image processor element 110D can be transferred from the transfer register 17 of that local image processor element to the receiving register 18 of the local image processor element 110A.

It can be understood that in this way, a procedure of adding together the contents of three memory cells has been eliminated, in the process of obtaining that required sum value. Thus a substantial increase in processing speed can be attained, by eliminating many unnecessary computation steps. Although only a very simple computation example has been described in the above, each transfer register 17 and receiving register 18 is configured as a first-in first-out type of multistage data register, so that a plurality of intermediate results can be transferred in this way from each of the local image processor elements 110A, 110B, 110C, 110D to a specific other one of the local image processor elements.

A fourth basic feature of the present invention will be described, which is a capability for setting respective initial values into the data registers of the local image processor elements 110A, 110B, 110C, 110D, as required by the respective programs that are stored in the local image processor elements, with this initializing operation occurring for each local image processor only during processing of a first local image of the source image. With a prior art programmable type of local image processor, such as the example of FIG. 1 described hereinabove, each local image is processed by a succession of program steps which are determined by the contents of successive addresses of the program memory, starting from an initial address, i.e. address 0. However this results in a lack of flexibility of utilization. Specifically, it is often necessary to set respective initial values into one or more registers (such as the data registers 30, 31, 32 in FIG. 6) before actual computation steps of the program are successively executed. With a prior art local image processor element, such initialization must be done each time that a local image is processed, i.e. one or more program steps must be used for this initialization operation each time the processing program is executed. However with the present invention, the local image processor can be operated such that for each local image processor element, the first time that the program stored in the local image processor element is executed (i.e. following a system reset pulse), the steps of that program are successively executed beginning from a fixed initial address 0, whereas each of the second and subsequent times that the program is executed, the the steps of that program are successively executed beginning from a predetermined "restart" address. This "restart" address can for example be the second or the third address of the program. In this way, the first program step (or the first and second steps, for example) can be used for initialization of registers, with this initialization being performed only once, at the start of processing, i.e. following system reset.

Figure 12:
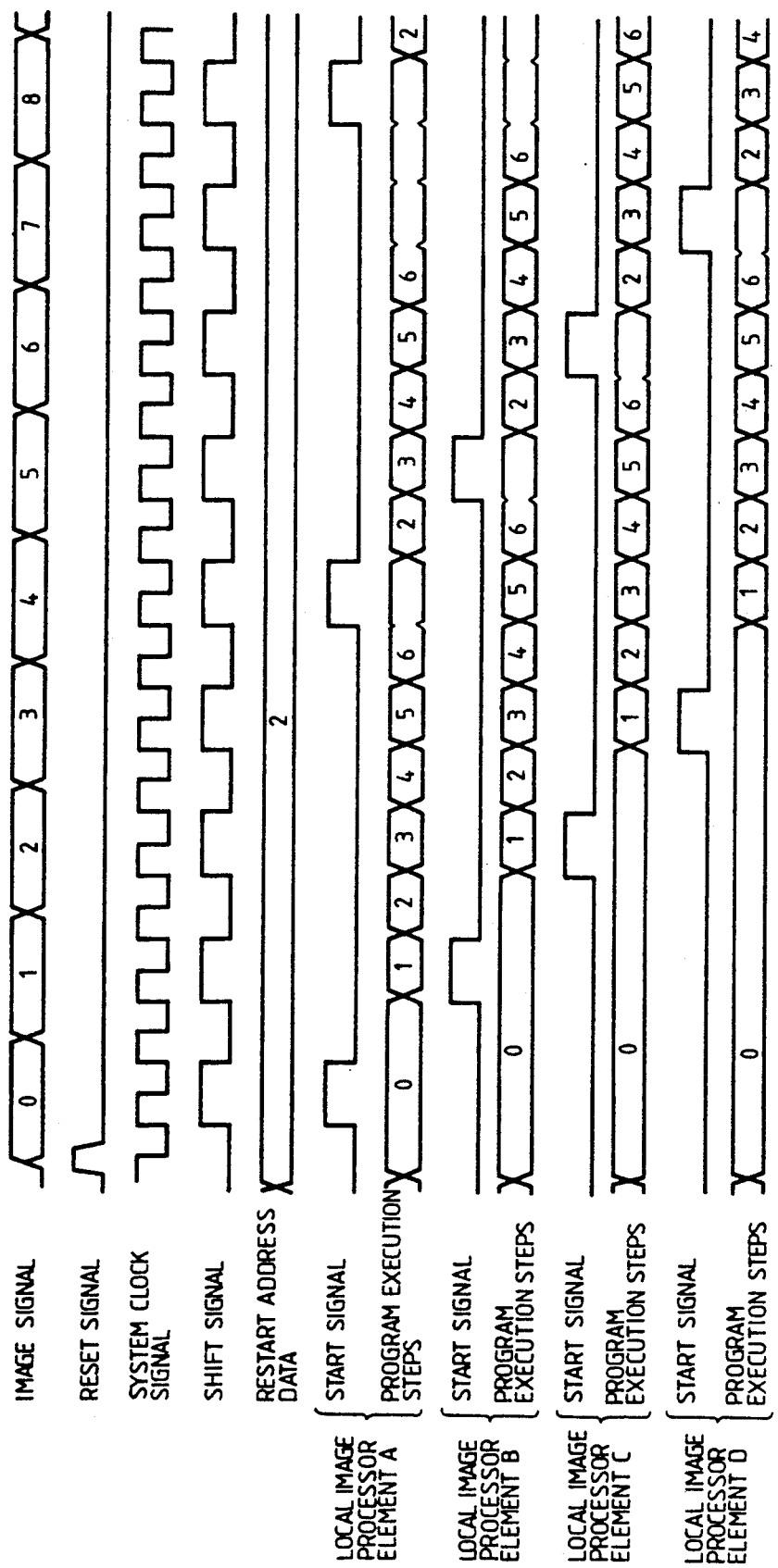
FIG. 12 is a a waveform diagram for describing the operation of program control circuit of a local image processor element.

This will be described referrring to the waveform diagram of FIG. 12. After the "H" level reset pulse has been applied to the processor control circuit 21 and to each of the local image processor elements 110A, 110B, 110C, 110D, and while the first set of three pixel data values are being supplied in parallel to the local image shifting circuit 20 during a first period of the image signal (indicated as the $0^{th}$ period in FIG. 12), these pixel data values are shifted into the local image shifting circuit 20 by the first "H" level pulse of the "shift" signal. At this time, the program control circuit 15 of each local image processor element is supplying the address value 0 to the corresponding program memory 14, i.e. for program step 0. It will be assumed that each of program steps 0 and 1 consists of initialization operations as described above. In response to a "start" signal pulse being generated in the local image processor element 110A, the program control circuit 15 of that local image processor element begins supplying successive addresses 1, 2, . . . to the program memory 14, so that program steps 0, 1, 2, . . . are successively executed. The same operations occur for each of the local image processor elements 110B, 110C and 110D, when the respective start pulses are successively generated therein, as shown in FIG. 12. At this time, a data value of 2 is being supplied to the program control circuit 15 of each of the local image processor elements 110A, 110B, 110C, 110D from the processor control circuit 21 of the local image processor 100, as the "restart" address value. The program control circuit 15 is configured such that, after the first complete execution of the processing program by a processor element, when the second "start" signal pulse is generated (e.g. in processor element 110A) the program control circuit 15 first supplies the address value 2 to the program memory 14, and thereafter supplies the values 3, 4, . . . successively. This also occurs after the third, fourth, etc. start pulses of that local image processor element. Thus in this case, the program steps 2, 3, 4, . . . are successively executed by the program memory 14 of the local image processor element 110A.

An identical process occurs for each of the other local image processor elements 110B, 110C and 110D, as shown in FIG. 12.

It can thus be understood that the initialization operations of program steps 0 and 1 are executed, by each local image processor element, only the first time that the program is executed. Thereafter, these initialization steps are skipped. Since such a program will usually contain only a small number of steps, e.g. 6 steps as shown in this example, this elimination of unnecessary initialization steps from each repetition of the program can enable substantially increased speed of processing.

Although a "restart" address value of 2 has been assumed in the above, it is equally possible to select any other desired value. If the "restart" address value is made 0, then the steps of the program stored in the program memory 14 will be executed sequentially from step 0 for each of the local images, in the same way as with a prior art local image processor.

A fifth basic feature of the present invention will be described in the following, which consists of a capability for parallel processing of successive local images by a plurality of local image processor elements, wherein the local image processor elements can execute respectively different forms of processing of each local image in accordance with their respective programs.

Figure 3:
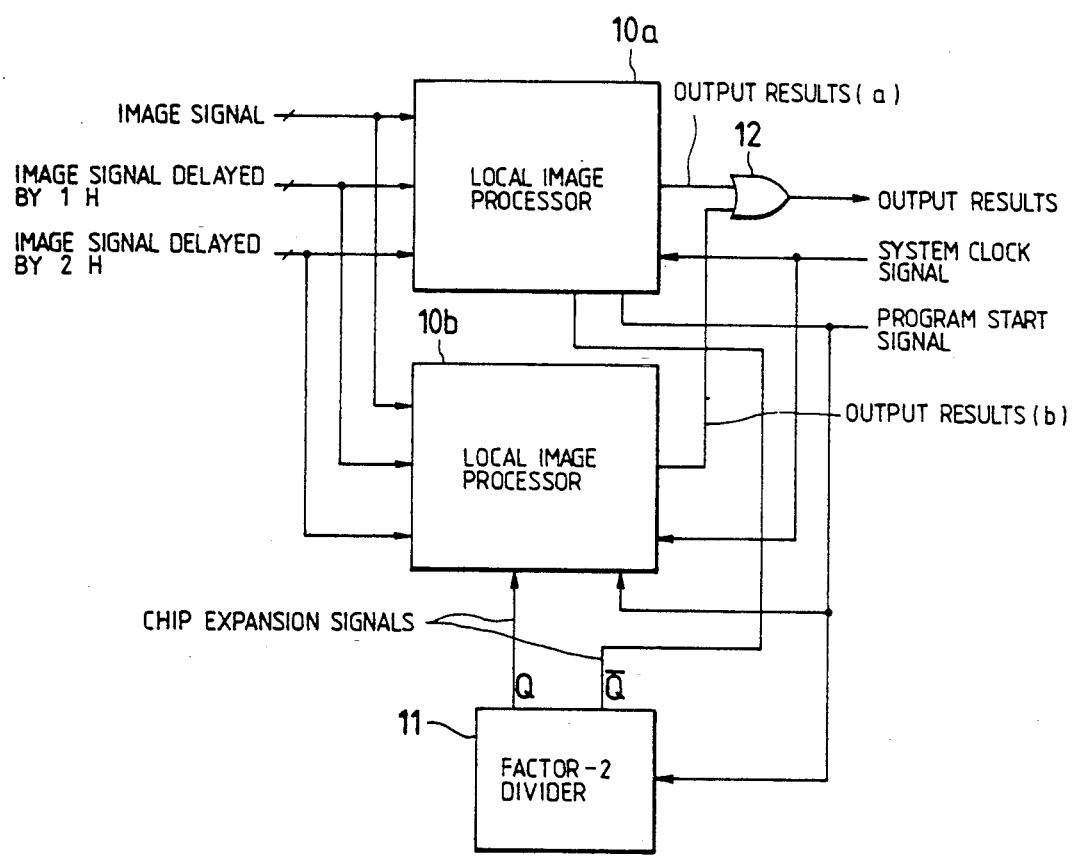
FIG. 3 is a connection diagram showing two of the local image processors of FIG. 1 connected for parallel processing operation.
Figure 4:
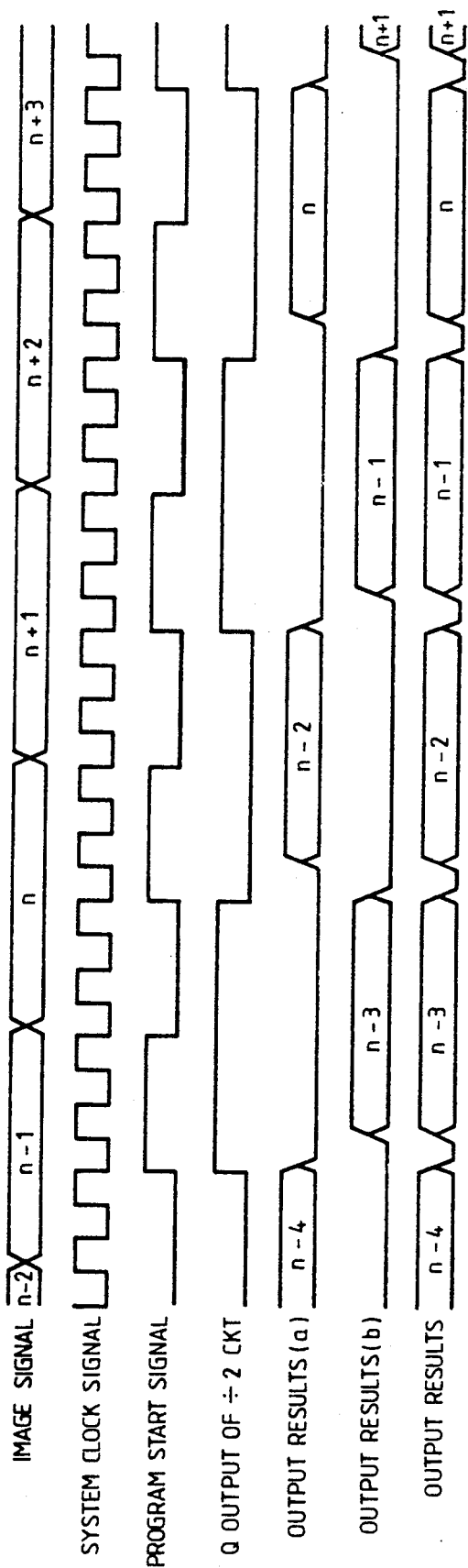
FIG. 4 is a waveform diagram for describing the operation of the local image processors of FIG. 3.

With a prior art stored-program type of local image processor such as that of FIG. 1 described above, it is possible to connect two or more local image processors for parallel processing (e.g. as shown in FIG. 3) to obtain an increased speed of operation. However it is only possible to execute parallel processing of the form shown in FIG. 4, in which each local image is subjected to identical processing by the local image processors, i.e. with each of the local image processors having an identical processing program stored therein. The internal configuration of such a prior art local image processor is fixedly configured such that this is the only type of multiprocessor operation that is possible. However there are certain image processing applications in which parallel multiprocessor operation is such that each local image processor executes a different program. For example, when video data obtained from a video camera are to be utilized to control the operation of an industrial robot (e.g. data representing a source image showing a workpiece), the video data can be pre-processed to be converted to labelled data of the form shown in FIG. 15. Here, each pixel of a background region of the image is represented in the labelled data by a fixed numeric value, which in this example is 0. A first object (i.e. a region of the original image which differs from the background region in a predetermined manner) has each pixel therein represented by another numeric value, i.e. 1. Similarly, each of other objects appearing in the original image is represented by a region formed of label numeral values, 2, 3, 4, etc. In order to obtain information concerning one or more specific labelled regions in the original image (e.g. for use in controlling the robot) it is possible to process this labelled data such as to measure, for example, the total area (i.e. total number of pixels) of a labelled region, the length of the boundary of a region, the central position of a region, etc. If prior art local image processors are used to execute such processing, which will be referred to in the following as image feature abstraction, and if parallel processing is to be used in order to achieve sufficient processing speed, then has been necessary in the prior art to use a set of local image processors which have been specially designed to be capable of executing respectively different programs while operating in parallel. It is not possible to use a general purpose prior art type of local image processor such as that shown in FIG. 1, which is capable only of parallel operation in which each of a plurality of local image processors executes an identical type of processing.

However with a local image processor according to the present invention, it is possible to utilize either the aforementioned first mode of multiprocessor operation in which successive local images are successively processed in an identical manner by a plurality of local image processor elements, i.e. with each local image processor element having an identical program stored therein, or the second mode of multiprocessor operation in which the local image processor elements 110A, 110B, 110C, 110D have respectively different programs stored therein, (e.g. for executing the image feature abstraction described above). As a result, image feature abstraction by multiprocessor parallel operation, to achieve an acceptably high level of processing speed, can be performed by the local image processor elements of one local image processor according to the present invention (or a plurality of such local image processors connected for parallel operation).

Specifically, the processor control circuit 21 of the local image processor 100 receives from an external source an image processing mode signal. When this is set at the "H" level, the first mode of operation is entered and the processor control circuit 21 generates various control signals for the local image processor elements 110A, 110B, 110C, 110D, to execute processing of the form shown in the waveform diagram of FIG. 13. In FIG. 13 it is assumed that two local image processors 100 are connected to receive the image data signal, for multiprocessor operation, with only the waveforms of one local image processor 100 being shown. In this mode each of the local image processor elements 110A, 110B, 110C, 110D has an identical processing program loaded into the program memory 14 of that processor element. The processor control circuit 21 also receives the chip expansion signal from an external control source, and when this chip expansion signal is at the "L" level, the processor control circuit 21 generates the internal chip expansion signals A, B, C and D for the local image processor elements 110A, 110B, 110C, 110D respectively, in synchronism with the periods of the image data signal and the system clock signal. The processor control circuit 21 also supplies the "program start" signal to each of the local image processor elements 110A, 110B, 110C, 110D. Each rising edge of the internal chip expansion signal A occurs on a falling edge of the "program start" signal, and each falling edge of the internal chip expansion signal A occurs on the succeeding falling edge of the "program start" signal, whereupon the internal chip expansion signal A goes to the "H" level, and returns to the "L" level on the next falling edge of the "program start" signal. Four successive "H" level pulses of the respective internal chip expansion signals A, B, C and D thereby occur sequentially as shown. When the chip expansion signal now goes to the "H" level, each of the internal chip expansion signals A, B, C and D is held at the "L" level so long as this "H" level state of the chip expansion signal continues. The processor control circuit 21 also generates the "shift" signal for shifting successive sets three 3 8-bit data values into the local image shifting circuit 20, once in each period of the image signal. In response to the internal chip expansion signal and the "program start" signal supplied to the clock signal control circuit 16 of the local image processor element 110A each going to the "H" level, the clock signal control circuit 16 sets the "start" signal to the "H" level on the first rising edge of the system clock signal to occur thereafter, and returns the "start" signal to the "L" level on the next rising edge of the system clock signal. This "start" signal is supplied to the program control circuit 15 of the local image processor element 11A, which responds to each falling edge of the "start" signal by sending to the program memory 14 the address of the next program step.

The program control circuit 14 also generates an output enable signal, which is identical in timing to the "start" signal and is supplied through the OR gate 38 to the control gate 37. When this "output enable" signal is at the "H" level (i.e. in synchronism with an "H" level state of the "start" signal) the processing results obtained in the immediately preceding operation step are outputted from the local image processor element 110A. Thus in this first mode, the results of processing the data of a local image by a processor element are outputted from that element immediately prior to the start of processing a subsequent local image.

In addition, in coincidence with this "H" level condition of the "start" signal and the "output enable" signal, the memory write signal that is produced from the clock signal control circuit 16 also goes to the "H" level, and on each falling edge of that signal the contents of the local image shifting circuit 20 are written into the local image memory 13 of the local image processor element 110A. Thereafter, until the next rising edge of the "start" signal (i.e. until the next shift of data into the local image shifting circuit 20 occurs), successive steps of the program held in the program memory 14 are executed on the data held in the local image memory 13, with command signals being generated from the program memory 14 in accordance with the contents of each step. In this way for example, the processing results obtained for the local image corresponding to the $(n-13)^{th}$ period of the image signal are outputted from the local image processor element 110A, then the local image corresponding to the $(n-5)^{th}$ period of the image signal is processed by that local image processor element. Following the start of that processing, when the "start" signal (and also the "output enable" signal) of the local image processor element 110B goes to the "H" level as a result of the "H" level state of the internal chip expansion signal B, the processing results obtained for the local image corresponding to the $(n-12)^{th}$ period of the image signal are outputted from the local image processor element 110B, then the local image corresponding to the $(n-4)^{th}$ period of the image signal is processed by that local image processor element. It can be understood that the local images that are respectively processed by the local image processor elements A and B in succession in this way are mutually related as shown in FIG. 10, i.e. (other than when the side of the source image has been reached) these differ by one pixel position along the horizontal image direction, corresponding to one period of the image signal.

Similarly, the processing results obtained for the local image corresponding to the $(n-11)^{th}$ period of the image signal are outputted from the local image processor element 110C, then the local image corresponding to the $(n-3)^{th}$ period of the image signal is processed by that local image processor element, and the processing results obtained for the local image corresponding to the $(n-10)^{th}$ period of the image signal are outputted from the local image processor element 110D, then the local image corresponding to the $(n-2)^{th}$ period of the image signal is processed by that local image processor element.

As described above, the processor control circuit 21 of each local image processor element outputs a chip expansion clock signal, shown in FIG. 13, having a period which is four times that of the program "start" signal. This is supplied to an external control circuit or processor (not shown in the drawings), which thereby generates a chip expansion signal as a signal which goes to the "H" level on a falling edge of the chip expansion clock signal, returns to the "L" level on the next falling edge of that signal and so on in succession. When two local image processors 100 are operated in parallel as in this example, the respective chip expansion signals which are supplied to these local image processors must of course mutually differ in phase by 180°.

Thus in the example of FIG. 13, while the chip expansion signal supplied to that local image processor is at the "H" level, so that the local image processor is held in an inactivated condition, the other one of the two local image processors is activated, and processes the local images corresponding to to the $(n-1)^{th}$, $n^{th}$, $(n+1)^{th}$ and $(n+2)^{th}$ periods of the image signal.

It can be understood from the above that in this first mode of operation of the processor 100, while the image processing mode signal that is supplied to the processor control circuit 21 of a local image processor is held at the "H" level, the "start" signal pulses that are supplied to the respective local image processor elements 110A, 110B, 110C, 110D of that local image processor are successively shifted in phase, whereby respectively different local images (i.e. respectively differing in image position by one pixel) are processed in parallel by the local image processor elements 110A, 110B, 110C, 110D. Normally in this mode of operation, identical processing is executed by each of the local image processor elements, i.e. each of the local image processor elements 110A, 110B, 110C, 110D has an identical program stored in the program memory 14.

Figure 15:
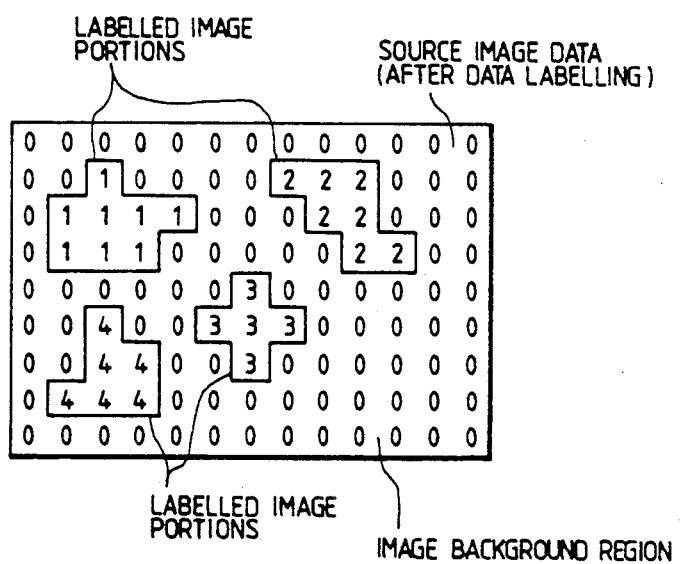
FIG. 15 is a diagram for assistance in describing processing of a source image which has been previously converted to an array of numeral-labelled pixels.

If however the image processing mode signal is held at the "L" level, then the second mode of operation of the processor 100 is entered. In this mode, the "start" signals that are respectively generated in the local image processor elements 110A, 110B, 110C, 110D are mutually identical, so that the four local image processor elements always have an identical local image stored in the local image memory 13 thereof, which is processed in parallel by these elements. In this mode of operation, the local image processor elements 110A, 110B, 110C, 110D will normally execute respectively different processing operations, i.e. they will each have a different processing program stored in the program memory 14. This second mode is especially useful for the above-mentioned image feature abstraction processing, as will be described in the following referring to the waveform diagram of FIG. 14 and the diagram of FIG. 15. In FIG. 15, the pixel data of a source image have been converted to labelled data, such that each pixel of the background region is expressed in that labelled data as the label number 0, each pixel of one shaped region within that background is expressed as the label number 1, and the pixels of three other shaped regions are respectively assigned the label numbers 2, 3 and 4. One or more of these shaped regions may for example correspond to a workpiece which is to be handled by an industrial robot It is frequently necessary to execute high-speed processing to obtain information regarding such shaped regions, such as the center position of a region, the total area of a region, the length of the periphery of a region, etc. This can be achieved by supplying the labelled data as an image signal (i.e. in which each pixel is expressed as a label number, rather than as a brightness value) to local image processors which contain appropriate programs.

The operation is as follows, with appropriate programs having been previously loaded into the program memories 14 of the local image processor elements 110A, 110B, 110C, 110D. It will be assumed that the program stored in the program memory 14 of the local image processor element 110A serves to measure the area of the region having label number 2 shown in FIG. 15, and that the program stored in the program memory 14 of the 110B serves to measure the length of the boundary of that region (expressed as a number of pixels), that the program stored in the program memory 14 of the 110C serves to measure the position of the center of that region with respect to the horizontal direction of the source image, and that the program stored in the program memory 14 of the 110D serves to measure the position of the center of that region with respect to the vertical direction of the source image. In this second mode of operation of the processor 100, the internal chip expansion signals that are supplied from the processor control circuit 21 of the local image processor element 100 to the clock signal control circuit 16 of each of the local image processor elements 110A, 110B, 110C, 110D are each fixedly held at the "H" level (while the chip expansion signal supplied to that processor is at the L level). The processor control circuit 21 also generates the program "start" signal and the "shift" signal, with the timing relationships shown in FIG. 14. In this case, the start signals which are generated from the clock signal control circuit 16 of each local image processor elements 110A, 110B, 110C, 110D are mutually identical, due to the fact that the internal chip expansion signals A to D are fixed at the "H" level, and do not consist of sequentially generated pulses as in the case of the waveforms of FIG. 13. Thus in response to each transition of the "program start" signal to the "H" level, an identical local image is written into the local image memory 13 of each of the local image processor elements 110A, 110B, 110C, 110D. As in the first mode described above, the memory write signal that is generated in each local image processor element is identical to the "start" signal, so that write-in of each new local image occurs in synchronism for each of the local image processor elements 110A, 110B, 110C, 110D (i.e. on the falling edge of each "start" signal pulse). When a new local image (e.g. the $(n-1)^{th}$ local image) has thus been loaded into the local image memory 13 of each local image processor element, it is then processed in parallel by the local image processor elements 110A, 110B, 110C, 110D in accordance with the respective programs that are stored therein. At the next "start" signal pulse, the next local image is loaded into the local image memory 13 of each of the local image processor elements, and the processing is repeated.

Upon completion of all of the labelled data of the source image, the output mode signal supplied to the processor control circuit 21 is set to the "H" level and the contents of the processing elements 110A, 110B, 110C and 110D successively outputted, as described hereinabove.

Specific examples of suitable programs for such image feature abstraction will be described in the following. A program for obtaining the total area of the region which is labelled 2 in FIG. 15 will first be described, which will be assumed to be stored in the program memory 14 of the local image processor element 110A. It will also be assumed that the "restart" address value (inputted to the program control circuit 15) is made equal to one, i.e. that the first program step will be used for initialization and that this step will only be executed at the beginning of processing the labelled data. The program will be described referring to the flow chart of FIG. 16. Following system reset, a first "H" level "start" signal pulse is generated and the program control circuit 15 of local image processor element 110A supplies the address value 0 to the program memory 14, which responds by supplying the data value 0 to the data selector 34 and generating command signals for transferring that value through the data selector 34 to the ALU 40 and for executing a logic AND operation by the ALU 40 on the two inputs thereof. Since one of these inputs is fixed at 0, a value of 0 is outputted from the program memory 14, and this is then written into the data registers 30 and 31. This completes the initialization processing, i.e. step S1 in FIG. 16.

In the next program step (S2), the value held in MASK 1 (i.e. the upper leftmost memory cell 7) of the local image memory 13 is read out, and is transferred through the data selector 35 to one input of the ALU 40, while the value 2 is outputted from the program memory 14 and supplied via the data selector 34 to the other input of the ALU 40. These two input values are then mutually subtracted by the ALU 40. If the result is 0, indicating that a value of 2 is held in MASK 1, then the ALU 40 sends a condition signal to the program control circuit 15 to cause the address of the next program step (S3) to be supplied to the program memory 14, and that step is then executed. If the result is other than 0, then the ALU 40 outputs a condition signal to the program control circuit 15 indicating that the program execution is to be terminated, and termination then occurs. In program step S3, the program memory 14 outputs a data value 1 which is transferred through the data selector 34 to the ALU 40. The ALU 40 then executes an addition operation, to produce as output the value 1, which is then written into each of the data registers 30 and 31. Program execution is then terminated.

Figure 16:
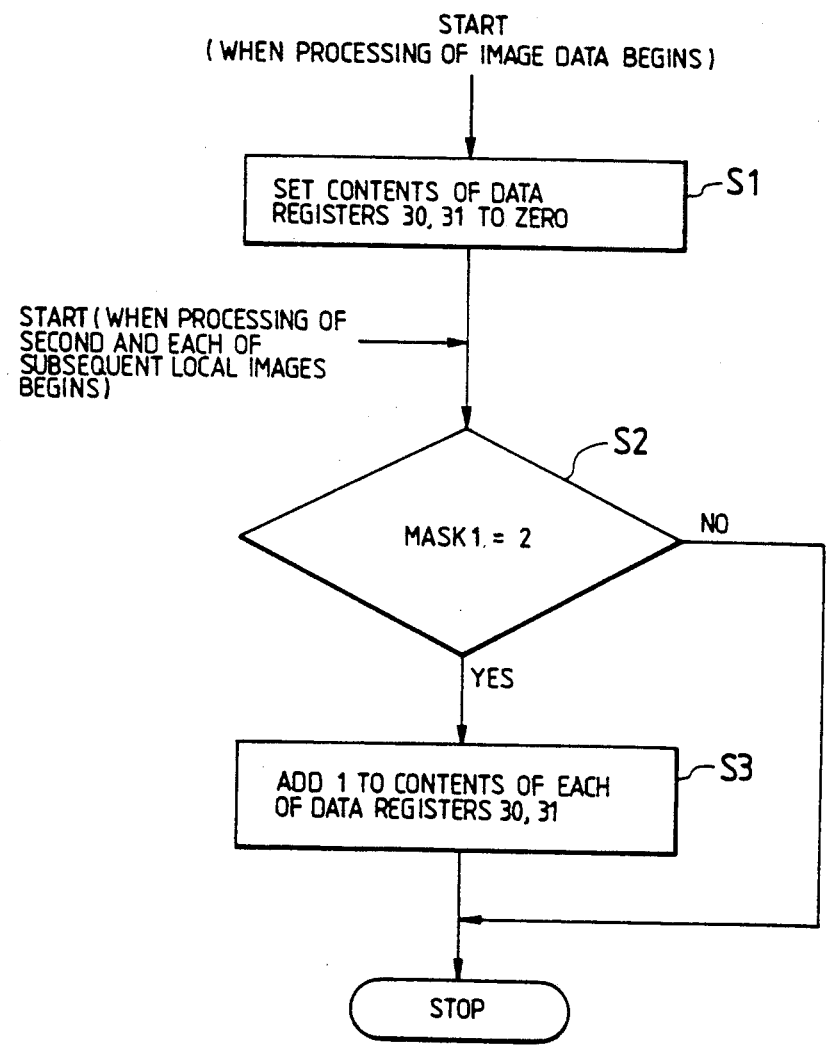
FIGS. 16 and 17 are flow charts showing examples of programs for use in image feature abstraction processing with labelled data supplied to the processor.

When the next "H" level pulse of the "start" signal occurs, the program control circuit 15 first supplies the address value 1 to the program memory 14. As a result, the initialization step S1 of FIG. 16 is skipped, and program execution begins at step S2. The above operations of steps S2 and S3 are then repeated. The same procedure occurs thereafter, each time the program is executed.

As a result, upon completion of processing all of the labelled data of the source image in this way, a final value will be left in the data register 31 which represents the total area of the region in the source image which has the label number 2.

Figure 17:
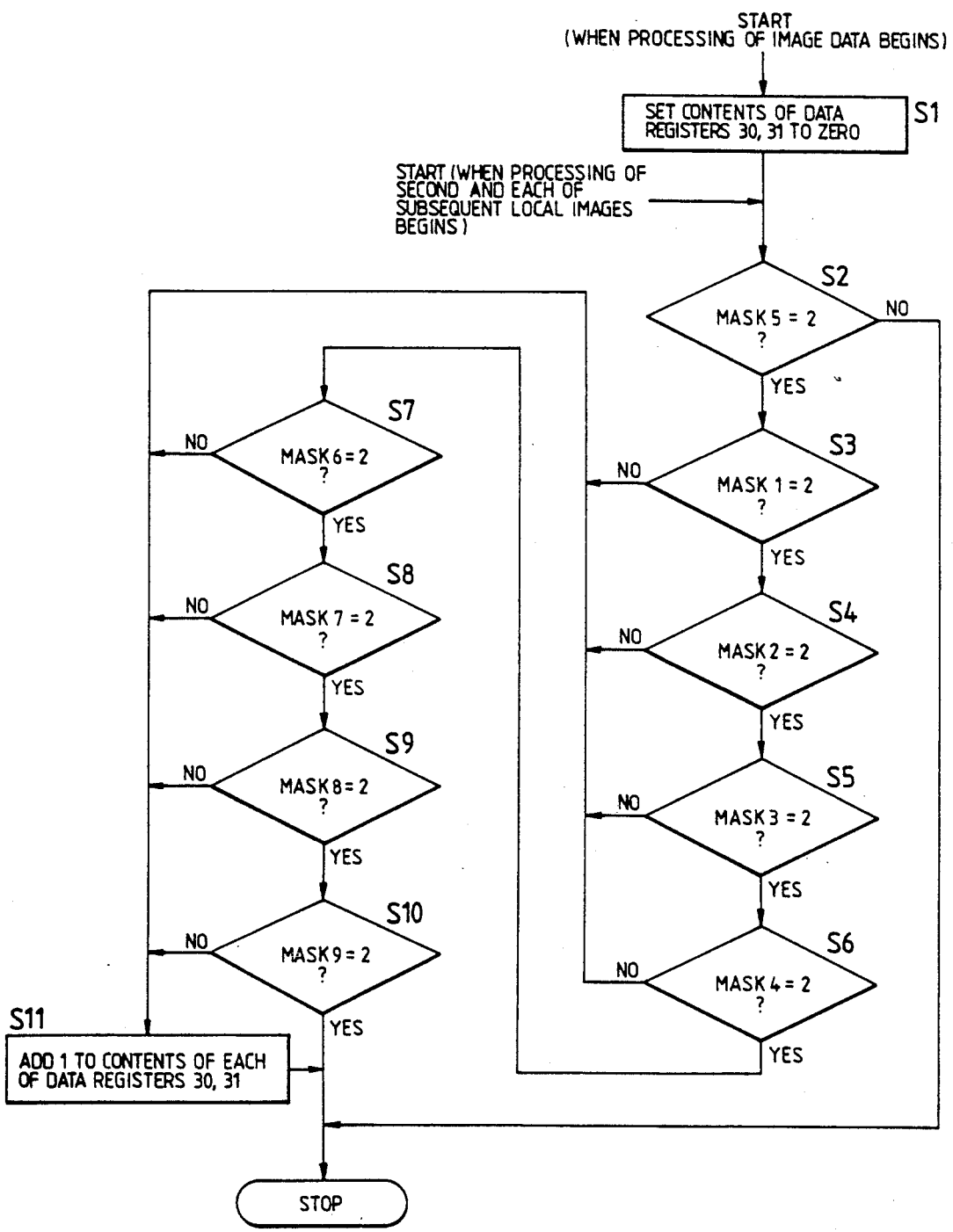

A program for obtaining the length of the boundary of the region having label number 2 (i.e. expressed as a total number of pixels) will be described referring to the flow chart of FIG. 17, assuming that this program has been loaded into the program memory 14 of the local image processor element 110B. Following system reset, the address value 0 is supplied from the program control circuit 15 of the local image processor element 110B to the program memory 14, then the initialization step described above for FIG. 16 is executed, to set the contents of each of the data registers 30, 31 to 0 (step S1). In the next program step (S2), the value of MASK 5 in the local image memory 13 is read (i.e. the contents of the central memory cell 7 of the local image memory 13 are read out) and transferred to the data selector 35, and hence to one input of the ALU 40. In addition, the data value 2 is supplied from the program memory 14 through the data selector 34 to the other input of the ALU 40, and a subtraction operation then executed by the ALU 40. If the result is 0, indicating that the value stored in MASK 5 is 2, then the ALU 40 sends a condition signal to the program control circuit 15 which designates that the next step of the program (S3) is to be executed. If the result is other than 0, the ALU 40 sends a condition signal to the program control circuit 15 which designates that program execution is to be terminated. In step S3, the value of address MASK 1 in the local image memory 13 is read out (i.e. the contents of the upper rightmost memory cell 7 of the local image memory 13 are read out) and transferred through the data selector 35 to one input of the ALU 40, the data value 2 is supplied from the program memory 14 through the data selector 34 to the other input of the ALU 40, and a subtraction operation then executed by the ALU 40. If the result is 0, indicating that the value stored in MASK ? is 2, then the next step of the program (S4) is executed. If the result is other than 0, the ALU 40 sends a condition signal to the program control circuit 15 designating that program step 11 is to be executed, i.e. the program control circuit 15 supplies to the program memory 14 the address corresponding to program step S11. In step S11, the program memory 14 outputs the data value 1, and generates command signals for transferring this data value through the data selector 34 to one input of the ALU 40 and for transferring the contents of the data register 30 through the data selector 35 to the other input of the ALU 40, and for execution of an addition operation by the ALU 40. The results of this addition are then written into the data registers 30 and 31, and program execution is terminated. Each of the program steps S4 to S10 is identical to step S3, but with respective tests being made on the values of MASK 2 to MASK 4 and MASK 7 to MASK 9, to determine whether or not each value is equal to 2. If the value of MASK 9 is found in step S10 to be equal to 2, program execution then terminates.

When the next "H" level pulse of the "start" signal occurs, the program control circuit 15 of local image processor element 110B first supplies the address value 1 to the program memory 14, so that the initialization step S1 is skipped, and processing begins at step S2. The above operations of steps S2 to S11 are then repeated. The same procedure occurs thereafter, each time the program is executed.

Upon completion of processing all of the labelled data of the source image in this way, a value will be left in the data register 31 which represents the total length of the boundary of the region having the label number 2, expressed as a number of pixels.

It can be understood from the above description of the various features of the preferred embodiment that a local image processor according to the present invention has significant and valuable advantages by comparison with the prior art, and that these include a very high degree of flexibility of use, e.g. being usable in a mode in which identical processing is executed in parallel by a plurality of local image processor elements on respectively different local images, and also in a mode in which respectively different types of processing are executed in parallel upon one local image at a time by the plurality of local image processor elements.

It should be noted that although the invention has been described with reference to a specific embodiment, the description is not intended in a limiting sense. Specifically, although the embodiment contains four local image processor elements, it would be possible to utilize a different number of local image processor elements, controlled from one processor control circuit 21 and coupled to one local image shifting circuit 20, and formed on a single IC chip.

Morever although the preferred embodiment contains a plurality of local image processor elements, the advantages described hereinabove which are provided by the incorporation of the transfer register 17 and receiving register 18, or by the incorporation of the counter register 19, would also be obtained if these were to be incorporated into a local image processor which is formed as only a single processing element.

What is claimed is:

1. A local image processor comprising:
local image shift register circuit means (20) for holding as local image data successive ones of a plurality of local images of a source image, each of said local images comprising an array having a predetermined size including a fixed number of pixels wherein said fixed number is independent of picture data associated with said local image, a plurality of local image processor elements (10A, 10B, 10C, 10D), and processor control circuit means (21) for controlling said plurality of local image processor elements and said local image shift register means, each of said local image processor elements comprising:
local image memory means (13) for periodically storing said local image data from said local image shift register circuit means;
counter register means (19) for holding a count value supplied from said processor control circuit means, said count value representing a number of times that successive local images have been stored into said local image memory means;
computation circuit means (40, 41) for executing processing operations by utilizing local image data stored in said local image memory means and said count value of said counter register means;
program memory means (14) for storing an image processing program and for generating output signals during execution of said program, for controlling said processing operations and for selectively controlling transfer of said local image data from said local image memory means to said computation circuit means; and
program control circuit means (15) for controlling said program memory means.

2. A local image processor comprising:
local image shift register circuit means (20) for holding as local image data successive ones of a plurality of local images of a source image, each of said local images comprising an array of pixels,
a plurality of local image processor elements (10A, 10B, 10C, 10D), and
processor control circuit means (21) for controlling said plurality of local image processor elements and said local image shift register means,
each of said local image processor elements being operable in an operation mode in which a data value required in a processing operation at a specific time point during processing of a local image is generated as an intermediate processing result by a predetermined other one of said local image processor elements prior to said time point, and each of said processor elements comprising:
local image memory means (13) for periodically storing said local image data from said local image shift register circuit means;
computation circuit means (40, 41) for executing processing operations by utilizing local image data stored in said local image memory means;
transfer register means (17) for receiving from said computation circuit means data values representing intermediate results of processing operations executed by said computation circuit means and for holding said data values, a first output terminal (B3) coupled to said transfer register means, for outputting said intermediate results to an external circuit receiving register means (18) for receiving from a transfer register means of said predetermined other one of said local image processor elements data values representing said intermediate processing results of processing operations executed thereby and for holding said data values, and a second output terminal (B5) coupled to said computation means for receiving a data value obtained as a final result of processing a local image;
program memory means (14) for storing an image processing program and for generating output signals during execution of said program for controlling said processing operations and for selectively controlling transfer of said local image data from said local image memory means to said computation circuit means; and
program control circuit means (15) for controlling said program memory means.

3. A local image processor comprising:
local image shift register circuit means (20) for holding as local image data successive ones of a plurality of local images of a source image, each of said local images comprising an array of pixels, a plurality of local image processor elements (10A, 10B, 10C, 10D), and processor control circuit means (21) for controlling said plurality of local image processor elements and said local image shift register means and for supplying to each of said local image processor elements a processing program restart address, each of said local image processor elements comprising:

local image memory means (13) for periodically storing said local image data from said local image shift register circuit means;

computation circuit means (40, 41) for executing processing operations by utilizing local image data stored in said local image memory means;

program memory means (14) for storing an image processing program and for generating output signals during execution of said program for controlling said processing operations and for selectively controlling transfer of said local image data from said local image memory means to said computation circuit means; and program control circuit means (15) for controlling said program memory means and for receiving said processing program restart address from said processor control circuit;

said program control circuit means being configured such as to supply to said program memory means a sequence of addresses extending from a fixed initial address during a first execution of said program, and to supply to said program memory means a sequence of addresses extending from said restart address, during each subsequent execution of said program.

4. A local image processor according to claim 3, in which a program step corresponding to said fixed initial address comprises an operation of initializing the contents of at least one register of said local image processor element.

5. A local image processor comprising:

local image shift register circuit means (20) for holding as local image data successive ones of a plurality of local images of a source image, each of said local images comprising an array of pixels, a plurality of local image processor elements (10A, 10B, 10C, 10D), each of said local image processor elements comprising:

local image memory means (13) for periodically storing said local image data from said local image shift register circuit means;

computation circuit means (40, 41) for executing processing operations by utilizing local image data stored in said local image memory means;

program memory means (14) for storing an image processing program and for generating output signals during execution of said program for controlling said processing operations and for selectively controlling transfer of said local image data from said local image memory means to said computation circuit means; and program control circuit means (15) for controlling said program memory means;

said local image processor further comprising processor control circuit means (21) for controlling said plurality of local image processor elements and said local image shift register means, in which said processor control circuit means includes means for selectively producing first and second control signals to place said local image processor elements in first and second operation modes, said first control signals from said processor control circuit means controlling said local image processor elements to operate in said first operation mode wherein successive ones of said local images are sequentially supplied from said shift register circuit means to respective ones of said local image processor elements to be sequentially processed thereby, said second control signals from said processor control circuit means controlling said local image processor elements to operate in said second operation mode wherein each of successive local images is supplied in common to each of said local image processor elements to be concurrently processed thereby.

6. A local image processor comprising:

local image shift register circuit means (20) for holding as local image data successive ones of a plurality of local images of a source image, each of said local images comprising an array having a predetermined size including a fixed number of pixels wherein said fixed number is independent of picture data associated with said local image;

a plurality of local image processor elements (10A, 10B, 10C, 10D), and processor control circuit means (21) for controlling said plurality of local image processor elements and said local image shift register means, each of said local image processor elements comprising:

local image memory means (13) for periodically storing said local image data from said local image shift register circuit means;

counter register means (19) for receiving and holding a count value supplied from said processor control circuit means, representing a number of times that successive local images have been stored into said local image memory means;

computation circuit means (40, 41) coupled to receive said count value from said counter register means, for executing processing operations by utilizing local image data stored in said local image memory means and said count value;

program memory means (14) for storing an image processing program and for generating output signals during execution of said program, for controlling said processing operations and for selectively controlling transfer of said local image data from said local image memory means to said computation circuit means; and program control circuit means (15) for controlling said program memory means.

7. A local image processor comprising:

local image shift register circuit means (20) for holding as local image data successive ones of a plurality of local images of a source image, each of said local images comprising an array of pixels;

local image memory means (21) for periodically storing said local image data from said local image shift register circuit means;

computation circuit means (40, 41) for executing processing operations by utilizing local image data stored in said local image memory means;

program memory means (14) for storing an image processing program and for generating output signals during execution of said program, for controlling said processing operations and for selectively controlling transfer of said local image data from said local image memory means to said computation circuit means;

processor control circuit means (21) for producing a processing program restart address;

program control circuit means for controlling said program memory means, and coupled to receive said restart address; and said program control circuit means being configured to supply to said program memory means a sequence of addresses extending from a fixed initial address during a first execution of said program, and to supply to said program memory means a sequence of addresses extending from said restart address, during subsequent executions of said program.

8. A local image processor comprising:

local image shift register circuit means (20) for holding as local image data successive ones of a plurality of local images of a source image, each of said local images comprising an array of pixels, a plurality of local image processor elements (10A, 10B, 10C, 10D), and processor control circuit means (21) for controlling said plurality of local image processor elements and said local image shift register means, each of said local image processor elements comprising:

local image memory means (13) for periodically storing said local image data from said local image shift register circuit means;

computation circuit means (40, 41) for executing processing operations by utilizing local image data stored in said local image memory means;

program memory means (14) for storing an image processing program and for generating output signals during execution of said program for controlling said processing operations and for selectively controlling transfer of data from said local image memory means to said computation circuit means; and program control circuit means (15) for controlling said program memory means;

wherein said processor control circuit means and said program control circuit means operate to modify the image processing program executed by the computation circuit means of a local image processor element in accordance with a position of the local image processed thereby within the source image.

9. A local image processor comprising:

local image shift register circuit means (20) for holding as local image data successive ones of a plurality of local images of a source image, each of said local images comprising an array of pixels, a plurality of local image processor elements (10A, 10B, 10C, 10D), and processor control circuit means (21) for controlling said plurality of local image processor elements and said local image shift register means, each of said local image processor elements comprising:

local image memory means (13) for periodically storing said local image data from said local image shift register circuit means;

computation circuit means (40, 41) for executing processing operations by utilizing local image data stored in said local image memory means;

program memory means (14) for storing an image processing program and for generating output signals during execution of said program for controlling said processing operations and for selectively controlling transfer of data from said local image memory means to said computation circuit means;

program control circuit means (15) for controlling said program memory means; and means for providing information to said computation circuit means of a local image processor element for identifying a position of said source image being processed thereby within a sequence of source images, thereby enabling modification of the image processing program executed by the computation circuit means of a local image processor element in accordance with the position of said source image processed thereby within the sequence of source images.

10. A local image processor as recited in claim 2 wherein said plurality of local image processor elements are arranged in an array, and wherein said first output terminal of one of said local image processor elements couples said one local image processor element to said predetermined other one of said local image processor elements, being adjacent thereto in said array, for providing thereto the intermediate processing results thereby enabling adjacent local image processor elements to process sequentially successive ones of said local images.

* * * * *